United States Patent [19]
Yoshimura et al.

[11] Patent Number: 5,841,513
[45] Date of Patent: Nov. 24, 1998

[54] APPARATUS FOR REPRODUCING SOUND SIGNALS RECORDED ON A MOTION PICTURE FILM WITH DIGITAL SOUND TRACK

[75] Inventors: Shunji Yoshimura, Tokyo; Yoshiyuki Akiyama, Kanagawa; Kiyoshi Ohsato, Chiba; Isao Ichimura; Toshio Watanabe, both of Kanagawa; Shinji Katsuramoto, Chiba, all of Japan

[73] Assignee: Sony Corporation, Japan

[21] Appl. No.: 847,776

[22] Filed: Apr. 24, 1997

Related U.S. Application Data

[60] Continuation of Ser. No. 450,729, May 25, 1995, abandoned, which is a division of Ser. No. 158,767, Nov. 30, 1993, Pat. No. 5,550,603.

[30] Foreign Application Priority Data

| Nov. 30, 1992 | [JP] | Japan | 4-320918 |
| Dec. 22, 1992 | [JP] | Japan | 4-356935 |
| Jun. 16, 1993 | [JP] | Japan | 5-168397 |

[51] Int. Cl.[6] .................................. G03B 31/02
[52] U.S. Cl. ............................. 352/27; 352/37
[58] Field of Search ................... 360/3, 48; 352/1, 352/3, 8, 11, 27, 37

[56] References Cited

U.S. PATENT DOCUMENTS

| 4,385,815 | 5/1983 | Elliott | 352/92 |
| 4,600,280 | 7/1986 | Clark | 352/37 |
| 5,155,510 | 10/1992 | Beard | 352/27 |
| 5,194,996 | 3/1993 | Shores | 360/48 |
| 5,327,182 | 7/1994 | Kohut et al. | 352/27 |
| 5,453,802 | 9/1995 | Kohut et al. | 352/27 |

FOREIGN PATENT DOCUMENTS

| 5-40938 | 2/1993 | Japan | G11B 7/00 |
| WO 91/05335 | 4/1991 | WIPO | |
| WO 91/16709 | 10/1991 | WIPO | G11B 20/12 |
| WO 92/14239 | 8/1992 | WIPO | G11B 7/00 |
| WO 9214239 | 8/1992 | WIPO | |

OTHER PUBLICATIONS

U.S. application No. 07/958664, Kentaro Odaka, filed Oct. 8, 1992.

*Primary Examiner*—Russell E. Adams
*Attorney, Agent, or Firm*—Limbach & Limbach L.L.P.

[57] ABSTRACT

A device for recording/reproducing a digital pattern as a sound track of a cinefilm is disclosed. The device includes a cinefilm 1 having an image recording area 2 in which an image is recorded, a perforation section 3 for film feed and digital pattern data recording areas 5 and 6 provided in the vicinity of the perforation section 3. Plural channels of audio data are recorded as the digital patterns in the digital pattern data recording areas.

29 Claims, 19 Drawing Sheets

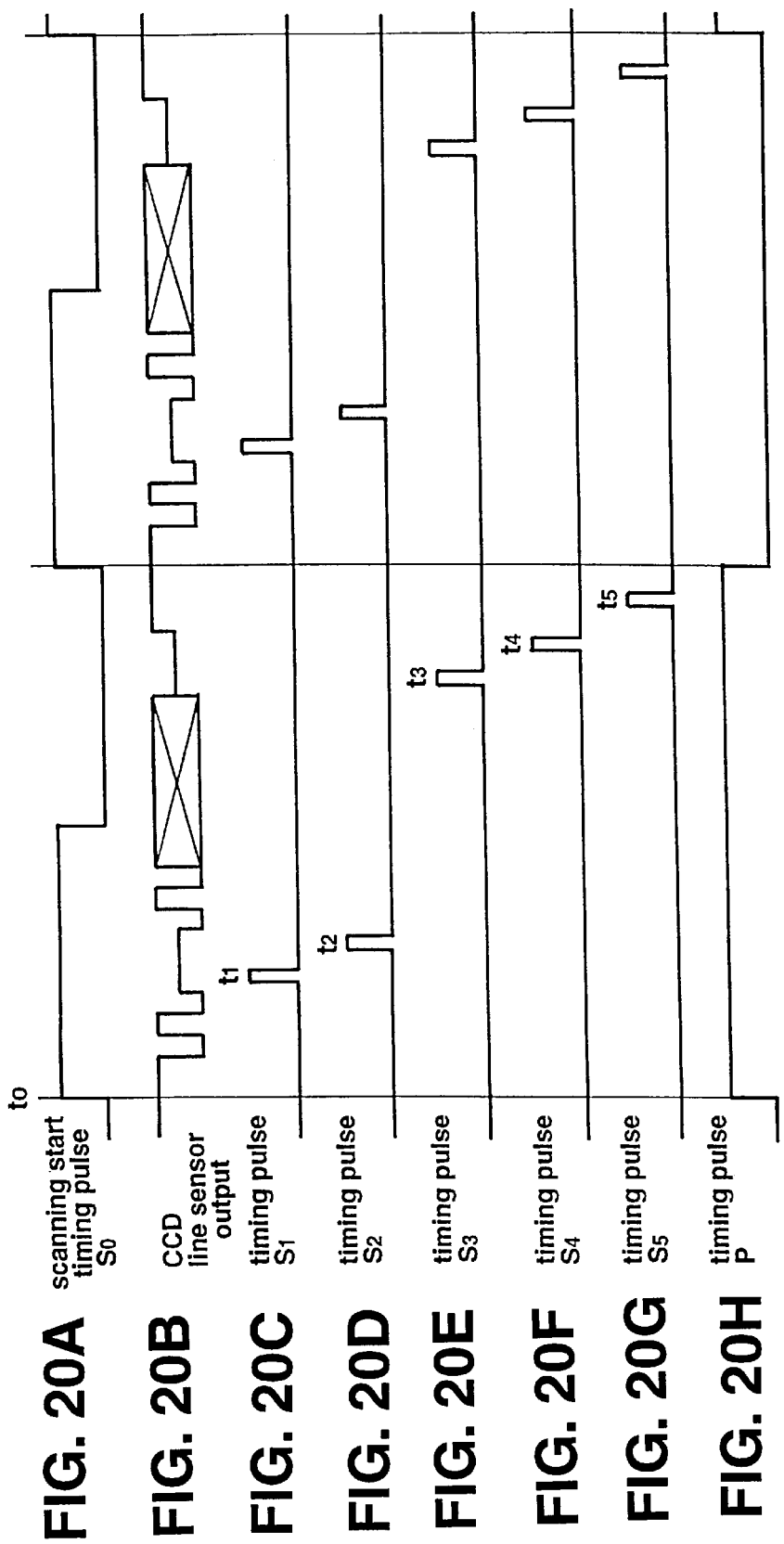

APPARATUS FOR REPRODUCING SOUND SIGNALS RECORDED ON A MOTION PICTURE FILM WITH DIGITAL SOUND TRACK

This is a continuation of application Ser. No. 08/450,729 filed on May 25, 1995, which is a divisional of U.S. patent application Ser. No. 08/158,767 filed Nov. 30, 1993 now U.S. Pat. No. 5,550,603.

FIELD OF THE INVENTION

This invention relates to a technique of recording and reproducing a digital sound track on a motion picture film in which digital audio signals of plural channels are represented by patterns of opaque and clear areas in the digital sound track.

BACKGROUND OF THE INVENTION

Conventional sound tracks for motion picture films directly record analog sound signals on the motion picture film. The present Applicant has already applied for patent for a technique of recording digital patterns in a digital sound track on a motion picture film to meet the demand for motion picture films with a higher sound quality (Japanese Patent Applications Nos. 3-222342 and 3-265001). Motion picture films have also been proposed in which the areas between the sprocket holes serve as recording areas for digital patterns representing the digital audio signals of plural channels (published International Patent Application No. WO 92/14239).

Motion picture film exhibitors have an increased requirement for motion picture sound reproduction with rich ambience. However it is difficult to reproduce stable audio signals from a motion picture film because of film weave and speed instability in the projector. In general, a motion picture projector cannot provide a playback accuracy as good as that achieved by an audio tape recorder. Hence it is desirable to represent the motion picture sound signals digitally to stabilize the reproduced sound signals. The present invention has been brought to completion under such background.

OBJECTS AND SUMMARY OF THE INVENTION

It is an object of the present invention to provide a motion picture film from which high-quality sound signals may be reproduced by digital processing.

It is another object of the present invention to provide a motion picture film that enables sound signals to be reliably reproduced by the playback system.

It is a further object of the present invention to provide a motion picture film that enables stable tracking to be performed in the playback system.

It is a further object of the present invention to provide a motion picture film that enables a sound field rich in ambience to be reproduced by the playback system.

It is a further object of the present invention to provide a motion picture film that facilitates generation of playback clock signals in the playback system.

It is a further object of the present invention to provide a motion picture film that enables digital sound signal errors due to film scratches to be minimized and that enables the rate at which errors occur in the sound signals reproduced by the playback system to be lowered.

It is a further object of the present invention to provide a motion picture film that enables errors in the reproduced digital sound signal to be corrected by the playback system to enable reliable reproduction of the sound signals.

It is a further object of the present invention to provide a motion picture film that enables the digital audio signals recorded on and reproduced from the film to be digitally processed in blocks in the recording system and in the playback system.

It is a further object of the present invention to provide a recording device for a motion picture film for formulating a motion picture film capable of reproducing a sound field rich in ambience in the playback system.

It is a further object of the present invention to provide a recording device for a motion picture film for formulating a motion picture film capable of simultaneously recording analog audio signals and audio data.

It is a further object of the present invention to provide a recording device for a motion picture film for formulating a motion picture film with which playback clocks may be formulated easily in the playback system.

It is a further object of the present invention to provide a recording device for a motion picture film for formulating a motion picture film with which the rate of error occurrence in the audio data may be lowered.

It is a further object of the present invention to provide a recording device for a motion picture film for formulating a motion picture film with which error correction of audio data may be made in the playback system.

It is a further object of the present invention to provide a recording device for a motion picture film for formulating a motion picture film on which audio data of plural channels may be digitally processed and recorded on the block basis.

It is a further object of the present invention to provide a reproducing device for a motion picture film whereby digital patterns in the digital pattern recording area of the motion picture film may be read for reliably reproducing the audio data.

It is a further object of the present invention to provide a reproducing device for a motion picture film whereby stable tracking may be achieved for reliably reproducing the audio data.

It is a further object of the present invention to provide a reproducing device for a motion picture film whereby the sound field rich in ambience may be reproduced.

It is a further object of the present invention to provide a reproducing device for a motion picture film whereby the audio data of plural channels may be reliably reproduced.

It is a further object of the present invention to provide a reproducing device for a motion picture film whereby the audio data may be corrected for errors for reliably reproducing the audio data of plural channels.

It is a further object of the present invention to provide a reproducing device for a motion picture film whereby the audio data of plural channels may be digitally processed on the block basis for reliably reproducing the audio data.

According to the present invention, there is provided a motion picture film on which there is formed an optically-readable digital sound track adapted to be read by a line element aligned perpendicular to the direction of travel of the motion picture film. The line element reads the sound track in response to a timing signal. The motion picture film comprises an elongate, flexible substrate having opposed edges and having a line of sprocket holes formed therein adjacent each of the edges. The motion picture film also includes an elongate digital pattern recording area on the substrate in the vicinity of one of the lines of sprocket holes.

Plural dots are formed in the digital pattern recording area in a rectangular array of tracks substantially perpendicular to the direction of travel of the motion picture film, and columns in the direction of travel. Each of the dots is in one of a first state and a second state. The first states and the second state are optically distinct from one another.

The digital pattern recording area is divided along the tracks into a first tracking pattern area, a signal pattern area, and a second tracking pattern area. In each of the first tracking pattern area and the second tracking pattern area, the dots are in opposite states in consecutive tracks to form a vertical synchronizing pattern adapted for generating the timing signal. The signal pattern area is disposed between the first tracking pattern area and the second tracking pattern area. In the signal pattern area, the states of the dots represent a digital sound signal of at least one channel.

The invention also provides a motion picture film on which there is formed an optically-readable digital sound track adapted to be read by a line element aligned perpendicular to the direction of travel of the motion picture film. The line element reads the sound track in response to a timing signal. The motion picture film comprises an elongate, flexible substrate having opposed edges and having a line of sprocket holes formed therein adjacent each of the edges. The motion picture film also includes an elongate digital pattern recording area on the substrate in the vicinity of one of the lines of sprocket holes. Plural dots are formed in the digital pattern recording area in a rectangular array of tracks substantially perpendicular to the direction of travel of the motion picture film, and columns in the direction of travel. Each of the dots is in one of a first state and a second state. The first states and the second state are optically distinct from one another.

The digital pattern recording area is divided along the tracks into a first tracking pattern area, a signal pattern area, and a second tracking pattern area. In the first tracking pattern area, the dots in each track include a string of first dots adjacent a string of second dots. The first dots are in a different state from the second dots, and the first dots in consecutive tracks are in opposite states to form a vertical synchronizing pattern adapted for generating the timing signal. The signal pattern area is disposed between the first tracking pattern area and the second tracking pattern area. In the signal pattern area, the states of the dots represent a digital sound signal of at least one channel.

The invention also provides a motion picture film on which there is formed an optically-readable digital sound track adapted to be read by a line element aligned perpendicular to the direction of travel of the motion picture film. The line element reads the sound track in response to a timing signal. The motion picture film comprises an elongate, flexible substrate having opposed edges and having a line of sprocket holes formed therein adjacent each of the edges. The motion picture film also includes an elongate digital pattern recording area on the substrate in the vicinity of one of the lines of sprocket holes. Plural dots are formed in the digital pattern recording area. Each of the dots is in one of a first state and a second state. The first state and the second state are optically distinct from one another.

The digital pattern recording area includes an elongate first tracking pattern area, an elongate second tracking pattern area, and an elongate signal pattern area. In the first tracking pattern area and the second tracking pattern area, the dots are arranged in a rectangular array of tracks substantially perpendicular to the direction of travel of the motion picture film, and columns in the direction of travel. The dots in the first tracking pattern area are arranged to form a vertical synchronizing pattern adapted for generating the timing signal. The vertical synchronizing pattern includes a string of first dots adjacent a string of second dots in each track of the first tracking pattern area. The first dots are in a different state from the second dots, and the first dots in consecutive tracks are in opposite states. The signal pattern area is disposed between the first tracking pattern area and the second tracking pattern area. The dots in the signal pattern area are arranged in a rectangular array of tracks substantially perpendicular to the direction of travel of the motion picture film, and columns in the direction of travel. The tracks of the signal pattern area are offset relative to the tracks of the first tracking area by a pre-set amount in the direction of travel. The states of the dots in the signal pattern area represent a digital sound signal of at least one channel.

According to the present invention, there is also provided a recording device for a motion picture film comprising a conversion circuit section for converting plural-channel audio data into dot-pattern data by data compression, and a spatial modulating section for optically modulating a recording light depending on dot-pattern data from said converting circuit section, wherein the plural-channel audio data is recorded by a modulated recording light from the spatial modulating section as a digital pattern in the digital pattern recording area provided in the vicinity of the perforation section of the motion picture film.

According to the present invention, there is also provided a device for reproducing the audio information in a digital pattern recording area recorded along with plural images consecutively recorded on a motion picture film, comprising an audio data reproducing circuit section for reproducing an audio data area of the digital pattern in the digital pattern recording area, and a tracking pattern reproducing circuit section for reproducing the tracking pattern recording area in said digital pattern recording area.

According to the present invention, there is also provided a device for reproducing the audio information in a digital pattern recording area recorded along with plural images consecutively recorded on a motion picture film, comprising a digital pattern readout section for optically reading a digital pattern in the digital pattern recording area, and a reproducing section for reproducing compressed audio data and appended data from a dot pattern data produced by reading the digital pattern by the digital pattern readout section, and expanding the compressed audio data for reproducing the audio data of respective channels.

The invention will now be described by way of example with reference to the accompanying drawings, throughout which like parts are referred to by like reference numerals.

BRIEF DESCRIPTION OF THE DRAWINGS

FIGS. 20A, 20B, 20C, 20D, 20E, 20F, 20G and 20H together form a timing chart illustrating the operation of the synchronizing control system.

DETAILED DESCRIPTION OF THE INVENTION

Figure 1:
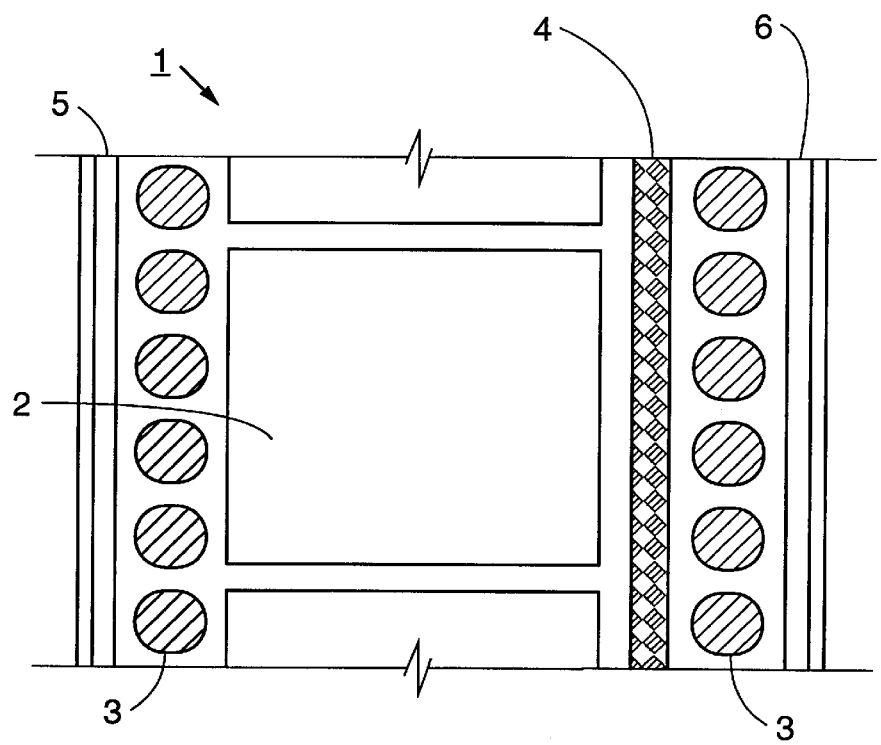
FIG. 1 shows a motion picture film according to the present invention, in its entirety.

The motion picture film according to the present invention is arranged as shown for example in FIG. 1.

In FIG. 1, 1 indicates the motion picture film, 2 indicates the picture area, 3 indicates the sprocket holes used to advance the motion picture film through the projector, 4 indicates the analog optical sound track in which analog audio signals are optically recorded, and 5 and 6 indicate the two digital sound tracks, the A1 track and the C1 track, respectively, each of which is located between the outer edges of the sprocket holes 3 and the respective edges of the motion picture film 1.

Figure 2:
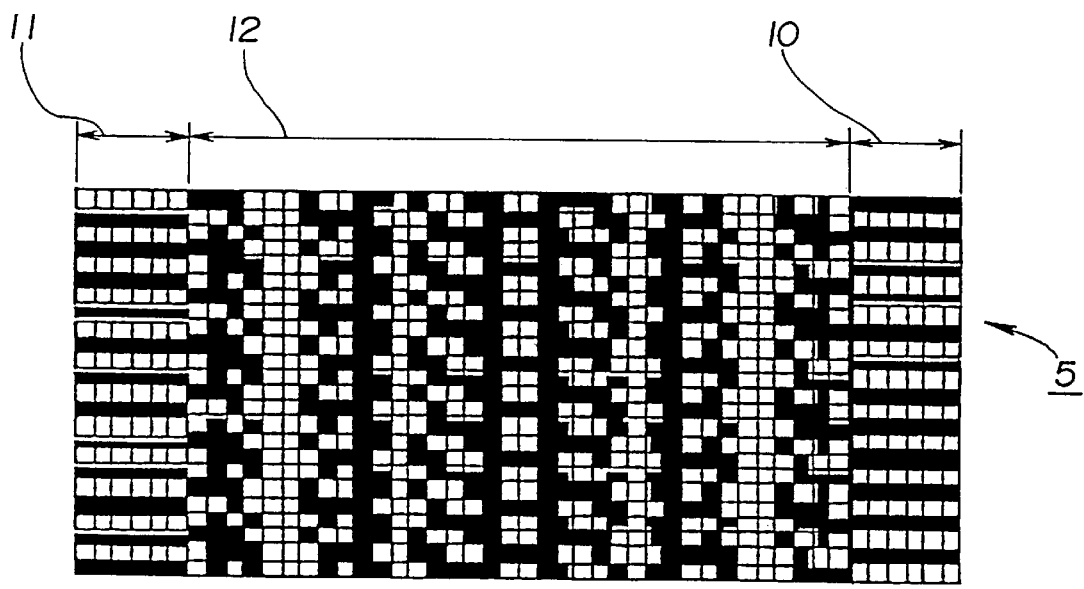
FIG. 2 is an enlarged view showing the digital pattern recorded in one of the digital sound tracks of the motion picture film.

FIG. 2 shows details of the digital sound track 5 as an example of the digital sound tracks 5 and 6 shown in FIG. 1. The digital sound track 5 shown in FIG. 2 is located between one edge of the motion picture film 1 and the outer edge of the adjacent sprocket holes 3. The digital sound track 5 is made up of the tracking pattern areas 10 and 11, having 12 dots and 11 dots, respectively, and the signal pattern area 12 located between the tracking pattern areas, the tracking pattern areas having 57 dots. In FIG. 2 the total number of dots is equal to 80, that is, 57+11+12.

In the signal pattern area 12, a coded digital sound signal derived from the digital sound signals of plural channels is represented by a pattern of substantially square areas that will be called dots for the sake of brevity. Each dot may be translucent or opaque depending on the digital state 0 or 1 represented by the dot. The dots in the signal pattern area 12 are arranged in tracks disposed perpendicular to the direction of travel of the motion picture film 1. Successive tracks are arrayed in the direction of travel of the motion picture film. The dots representing each byte of the coded digital sound signals are arrayed in a two-dimensional array of three dots in each of three successive tracks.

Three dots arrayed for example along a track are capable of representing a total of eight digital states [000] to [111]. However, the pattern of [000] consisting only of translucent regions is not used. This is to prevent the situation in which a state devoid of signal changes is produced for a prolonged time due to run-length limitations caused by the edge recording of the recording pulses during recording. Consequently, the three dots may represent only seven digital states. Three dots in three successive rows arrayed in the longitudinal direction are used to represent each byte of the coded digital sound signal derived from the digital sound signals of the plural channels. An array of three dots in three successive tracks has $7^3=343$ distinct states that can be used to represent each byte. Of these 343 states, 256 states, for example, are adopted and used to represent the 256 states of each byte of the coded digital sound signal. The coded digital sound signal represented by the dot patterns in the signal pattern area 12 may represent time scale information, channel information, etc. in addition to representing the digital sound signals. For simplicity, the term "digital sound signal" will be taken to encompass such additional information.

The tracking pattern areas 10 and 11 are provided adjacent the left and right edges of the signal pattern area 12. The tracking patterns in consecutive tracks have a bit shift of one. A coded digital sound signal derived from the digital sound signals for four channels is recorded in each of the digital sound tracks 5 and 6, so the digital sound signals of a total of eight channels are recorded on the motion picture film 1.

The signal pattern area 12 is segmented into blocks at an interval of, e.g., 16 tracks, as will be described in more detail below. The numbers of dots in the signal pattern area and the tracking pattern areas of the digital sound tracks 5 and 6 are indicated in FIG. 2. Although the number of dots in the tracking pattern area 10 differs from that in the tracking pattern area 11, this is merely a matter of design irrelevant to the present invention and hence will not be described further. FIG. 2 illustrates a segment of 24 tracks of the digital sound track 5.

Figure 3:
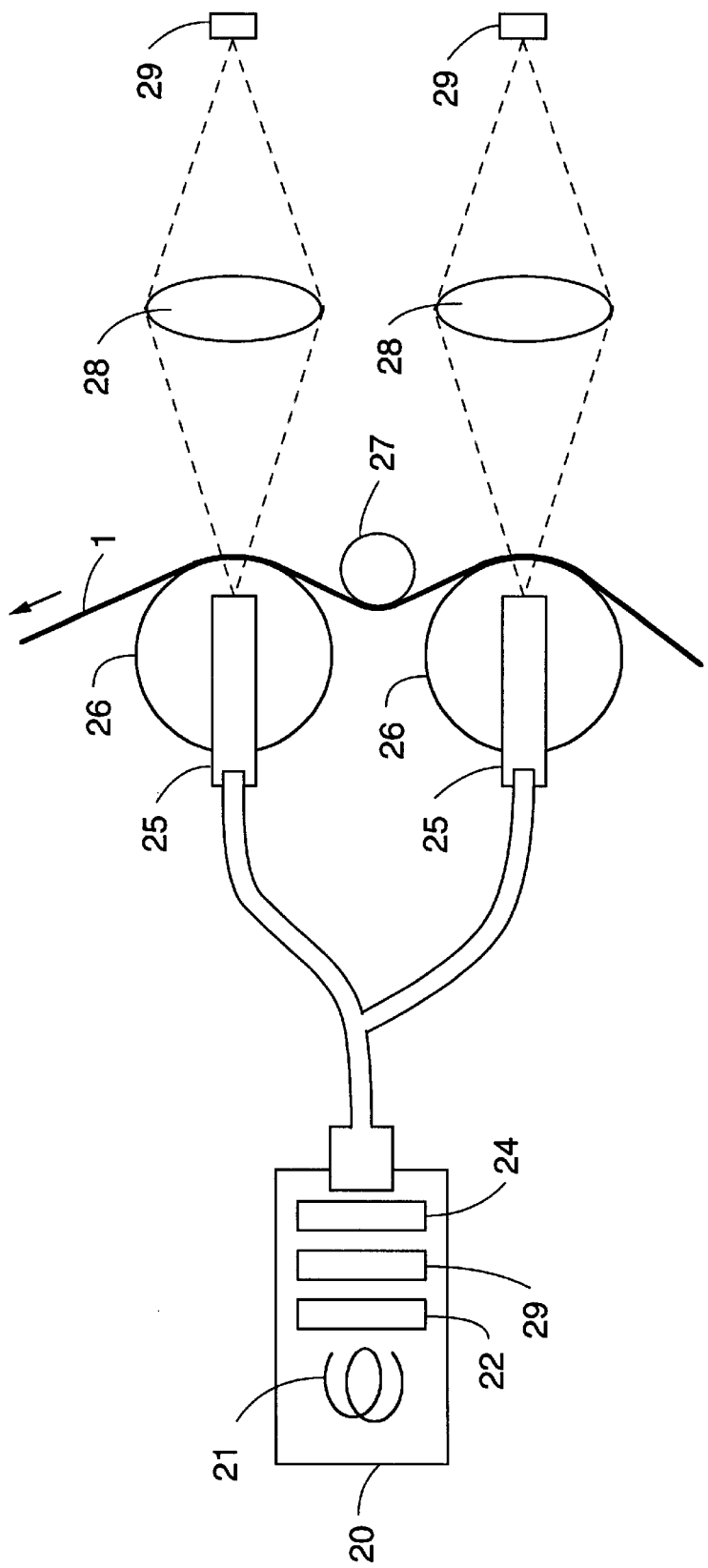
FIG. 3 shows the optical system for reproducing the digital pattern recorded in the digital sound tracks of the motion picture film.

FIG. 3 shows the optical system for reading the dot pattern in each track in the digital sound tracks 5 and 6. The light source 20 is made up of the halogen lamp 21, hot mirrors 22 and 23 for removing heat and infrared radiation from the output of the lamp 21, and the high-pass filter 24 for improving the S/N ratio.

The light from the light source 20 is split by the optical fibers 25 and 25 into two paths for illuminating the digital sound tracks 5 and 6 located adjacent the opposite edges of the motion picture film 1. The light from the ends of the optical fibers 25 and 25 illuminates the motion picture film 1 in the vicinity of the digital sound drums 26 and 26. The motion picture film 1 is fed in the vertical direction in FIG. 3. Also shown is the auxiliary film feed roller 27.

The objective lenses 28 and 28 form images of the illuminated dot pattern in the digital sound tracks of the motion picture film 1 on the scanning CCD line sensors 29 and 29. The scanning CCD line sensors convert the dot patterns in each track of the digital sound tracks to an electrical dot pattern signal. In FIG. 3, the optical fiber 25, the digital sound drum 26, the object lens 28 and the CCD 29 are associated with each of the digital sound tracks 5 and 6. Although not shown in FIG. 3, the upper and lower optical systems in FIG. 3 are actually arranged above and below the plane of the drawing sheet for reading the digital sound tracks 5 and 6, respectively.

Figure 4:
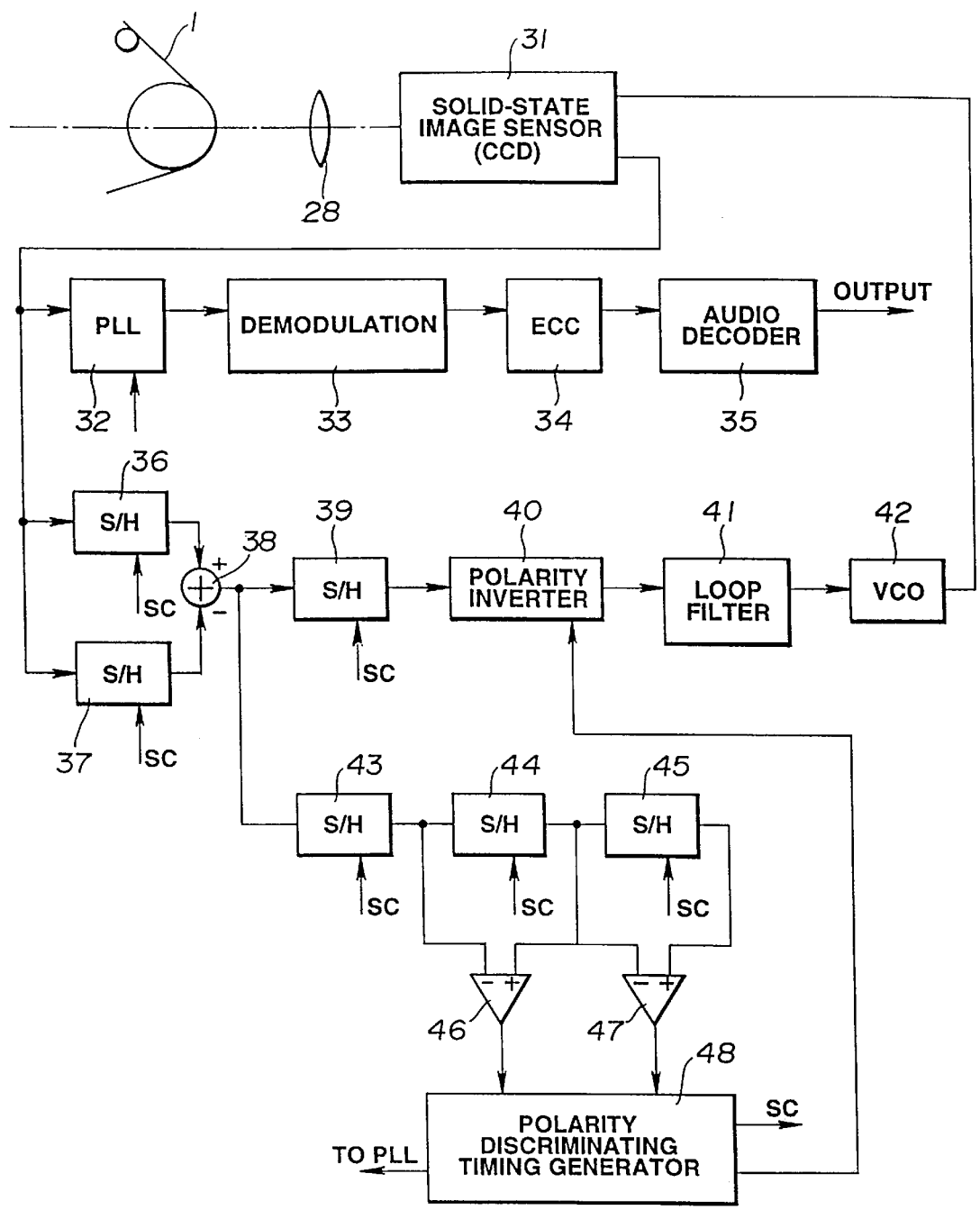
FIG. 4 is a block diagram showing the arrangement for processing the digital sound signals reproduced by the optical system shown in FIG. 3.

FIG. 4 is a block diagram of the electrical circuit for reproducing the digital sound signals from the dot pattern in the digital sound tracks read by the arrangement shown in FIG. 3. Although the circuit shown in FIG. 4 is provided for each of the digital sound tracks 5 and 6, only one of the circuits is shown for simplicity.

The dot pattern is captured as an image by the CCD line sensor 31, part of the scanning CCD line sensor 29 shown in FIG. 3. The height of the CCD line sensor 31 in the direction of travel of the motion picture film 1 is substantially one half, or less than one half, of the height of the image formed on the CCD line sensor 31 of each track of the digital sound track 5. When capturing the dot pattern in the digital sound track, the CCD line sensor 31 scans each track twice. The CCD line sensor scans an on-track portion of the track once and an off-track portion of the track once in a timed relation relative to each other. The timing of the scanning is controlled by an arrangement which will be described below. When scanning the on-track portion, the CCD line sensor scans along the middle of each track, and when scanning the off-track portion, the CCD line sensor scans the transition between the track and the next track.

The dot-pattern signal produced by the CCD line sensor 31 is fed to the PLL circuit 32. The dot patterns in the signal pattern area 12 are of a self-synchronizable 3×3 pattern, as described above, and the output signal of the PLL circuit 32 is synchronized using a channel clock. The output of the PLL circuit 32 is demodulated by the demodulator 33 and corrected for errors by the ECC circuit 34. The resulting coded digital sound signal is decoded by the audio decoder 35, which feeds out the digital sound output signal of at least one channel as shown.

The dot-pattern signal from the CCD line sensor 31 is also fed into the sample-and-hold (S/H) circuits 36 and 37. The tracking signals, which are the part of the dot-pattern signal resulting from reproducing the tracking pattern areas 10 and 11, are held by the S/H circuits 36 and 37, respectively.

The output signals from the S/H circuits 36 and 37 are supplied to the subtractor 38 to produce a difference signal which is supplied to the sample-and-hold (S/H) circuit 39. The S/H circuit 39 holds the sample values of the off-track points, i.e., the zero-crossing points. The off-track points correspond to the output generated by the CCD line sensor 31 when it scans the transition between adjacent tracks in the digital sound track. The tracking servo operates to reduce the difference signal to zero in a manner that will be described below. In general, it is preferable for the tracking servo to operate using the on-track information, that is, on data obtained when the CCD line sensor scans each track in the digital sound track. However, it easier for the servo circuit to detect the off-track condition.

When a tracking deviation occurs, the polarity inverter 40 generates a constantly positive output or a constantly negative output, so that the polarity of the output of the polarity inverter indicates the direction of the tracking deviation.

The output of the polarity inverter 40 is supplied to the loop filter 41 and error signals up to a pre-set band limit are integrated. The output of the loop filter controls the frequency of the VCO circuit 42 to generate scanning timing signals for the CCD line sensor 31 to cause the CCD line sensor 31 to scan the center lines of the tracks notwithstanding variations in the speed of the film.

The portion of the circuit of FIG. 4 that generates signals at various timings will now be described. The difference signal output from the subtractor 38 is supplied to the sample-and-hold (S/H) circuits 43, 44 and 45. These S/H circuits are functionally equivalent to a shift register, so that the S/H circuit 43, the S/H circuit 44 and the S/H circuit 45 respectively provide outputs corresponding to the difference signal from the subtractor 38 during the current scan of the CCD line sensor 31, the difference signal during the scan directly preceding the current scan of the CCD line sensor 31, and the difference signal during the scan preceding the current scan by two successive scans of the CCD line sensor 31.

The comparators 46 and 47 determine whether the difference signal has increased between successive scans and feed corresponding outputs to the polarity discriminating and timing generating circuit 48. The polarity discriminating and timing generating circuit detects a pattern of increasing difference signals in the sequence of the S/H circuits 43, 44 and 45. Such a pattern indicates that the scan directly preceding the current scan is off-track. The polarities of the respective scan samples may also be discriminated simultaneously.

Based on the discriminating operation, the polarity discriminating and timing generating circuit 48 generates the sample clock SC, a positive or negative signal and on-track information and feeds the sample clock, positive or negative signal and the on-track information to the S/H circuits, the polarity invertor 40 and to the PLL circuit 32, respectively.

The operation of the S/H circuits and their outputs are shown in FIGS. 5A–5E', in which levels indicated by solid lines indicate the on-tracking state and levels indicated by broken lines indicate the off-tracking state, respectively. The waveform A represents the signal received from the CCD line sensor 31. This signal is roughly divided into the dot-pattern signal and the blanking signal B. The dot-pattern signal is subdivided into the coded digital sound signal and the tracking signal T. The S/H circuit 36 samples the tracking signal reproduced from the tracking pattern area 10 adjacent one edge of the signal pattern area 12 of the digital sound track, while the S/H circuit 37 samples the tracking signal reproduced from the tracking pattern area 11 adjacent the other edge of the signal pattern area. In FIGS. 5A–5E', the arrows indicate the sampling timings in the S/H circuits.

The waveform B and the waveform C indicate the outputs of the S/H circuits 36 and 37, respectively. The difference between the outputs is taken by the subtractor 38, the output of which is represented by the waveform D.

Figure 5A:
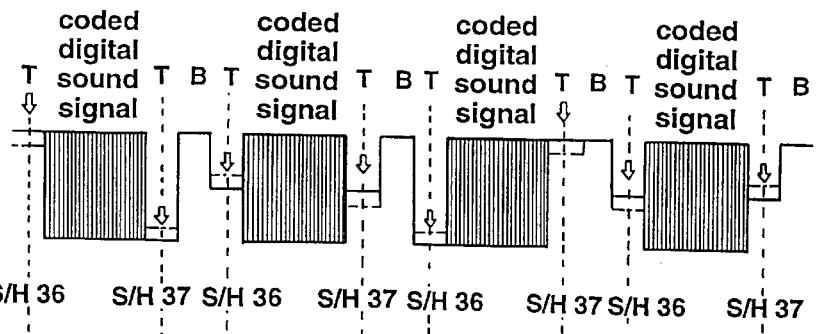
FIGS. 5A, 5B, 5C, 5D, 5E and 5E' are waveform diagrams showing the processing by the sample-and-hold circuits in FIG. 4.
Figure 5B:
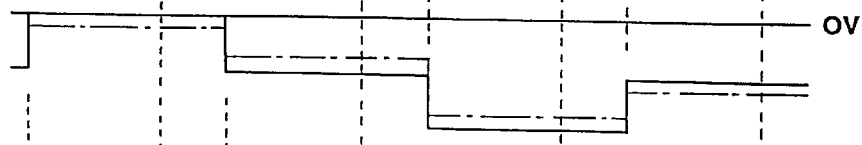
Figure 5C:
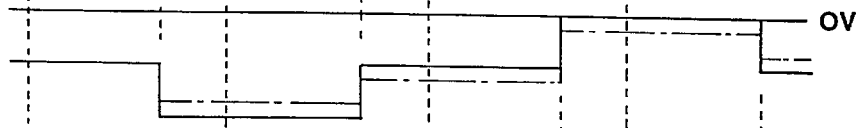
Figure 5D:
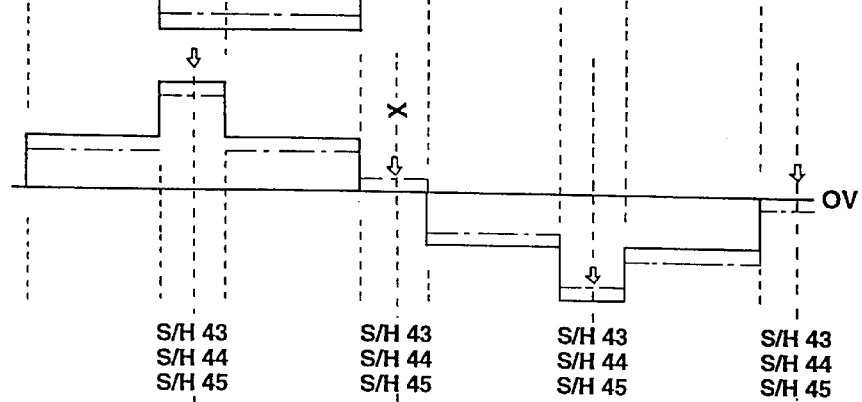

The S/H circuits 43, 44 and 45 are controlled for sampling the on-track portions. The resulting outputs are fed via the comparators 46 and 47 to the polarity discriminating and timing generating circuit 48 where the condition of the output level increasing in the order of the S/H circuits 43, 44 and 45 is detected as mentioned above. Thus, the center data shown by an asterisk * in FIG. 5D is found to be offtrack.

Figure 5E:
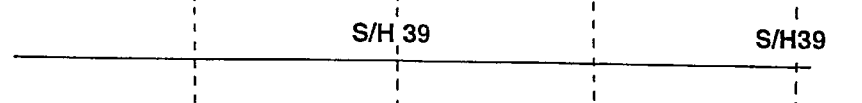
Figure 5E:
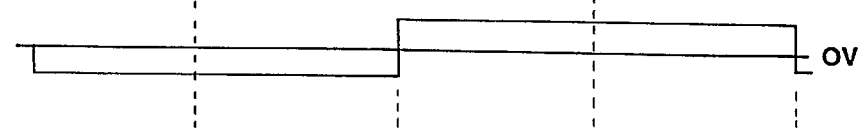

When the off-track position is detected, a control signal is supplied to the S/H circuit 39 to cause the S/H circuit 39 to sample the tracking signal at this position. The difference of the output of the S/H circuit 39 from zero level indicates the amount of track deviation. Consequently, if the correct tracking state at the off-track position is achieved, that is if a 0-level signal is obtained, the output of the S/H circuit 39 becomes zero. If the tracking deviates a pre-set amount, the output level corresponds to the deviation, as indicated in FIG. 5E'.

The outputs of the S/H circuit 39 and the polarity discriminating and timing generator 48 are supplied to the polarity invertor 40 where the positive and negative deviations of the off-track portions are inverted to negative and positive values, respectively, for generating constant deviations.

Although the amount of tracking deviation is corrected in the present embodiment by taking the difference between tracking signals generated by reading the tracking pattern areas 10 and 11, the present embodiment is also effective in coping with fluctuations in the illumination generated by the light source 20, development fluctuations produced when the dot patterns are recorded in the digital sound tracks of the motion picture film and with amplitude fluctuations in the dot pattern signals produced by individual differences.

Figure 6:
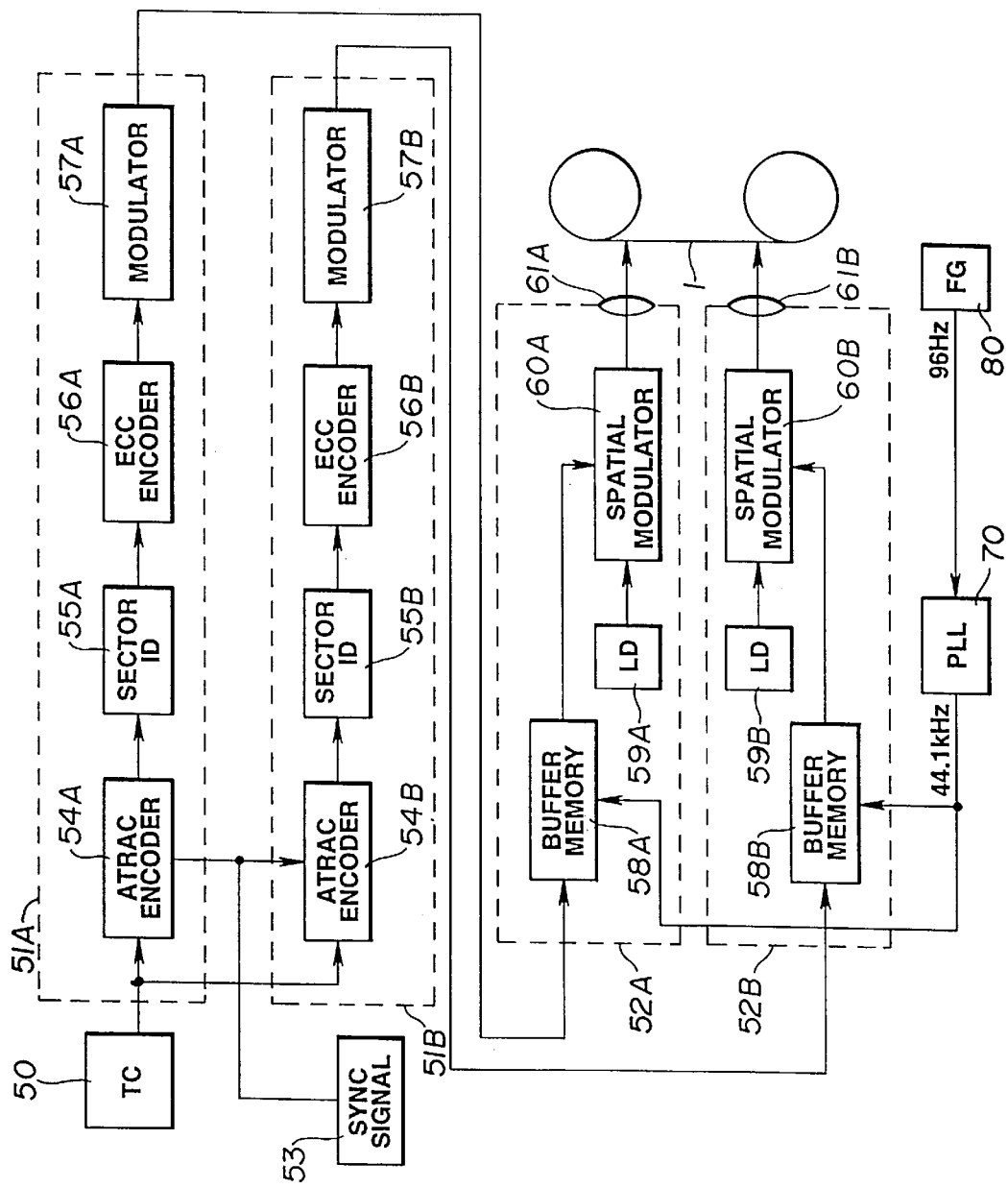
FIG. 6 is a block diagram showing the arrangement of the sound camera for recording the motion picture film according to the present invention.

A specific embodiment of the sound camera for recording the dot patterns in the digital sound track of the motion picture film according to the present invention will be described next with reference to FIG. 6.

The sound camera for the motion picture film is made up of first and second converting circuits 51A and 51B for converting the digital sound signals of eight channels supplied from a multi-channel tape decoder 50 by data compression into a dot pattern signals, and first and second optical recording units 52A and 52B for performing optical recording in accordance with the dot-pattern signals from the first and second converting circuit 51A and 51B. The digital sound signals of eight channels are thus recorded as dot patterns in the digital sound tracks provided in the vicinity of sprocket holes of the motion picture film 1.

The first and second converting circuits 51A and 51B each process the digital sound signals of four of the eight channels supplied by the multi-channel decoder 50, and are each made up of the signal compressor circuits 54A and 54B, the sector-forming circuits 55A and 55B, the ECC encoders 56A and 56B and the modulating circuits 57A and 57B, all of which operate in response to control signals supplied by the synchronizing signal generator 53.

The signal compressor circuit 54A and the signal compressor circuit 54B each compress the digital sound signals of four channels using high-efficiency encoding, which is a combination of sub-band coding, orthogonal transform coding and adaptive bit allocation. The signal compressor circuits each reduce the number of bits required to represent the digital sound signals of the four channels to one-fifth.

Figure 7:
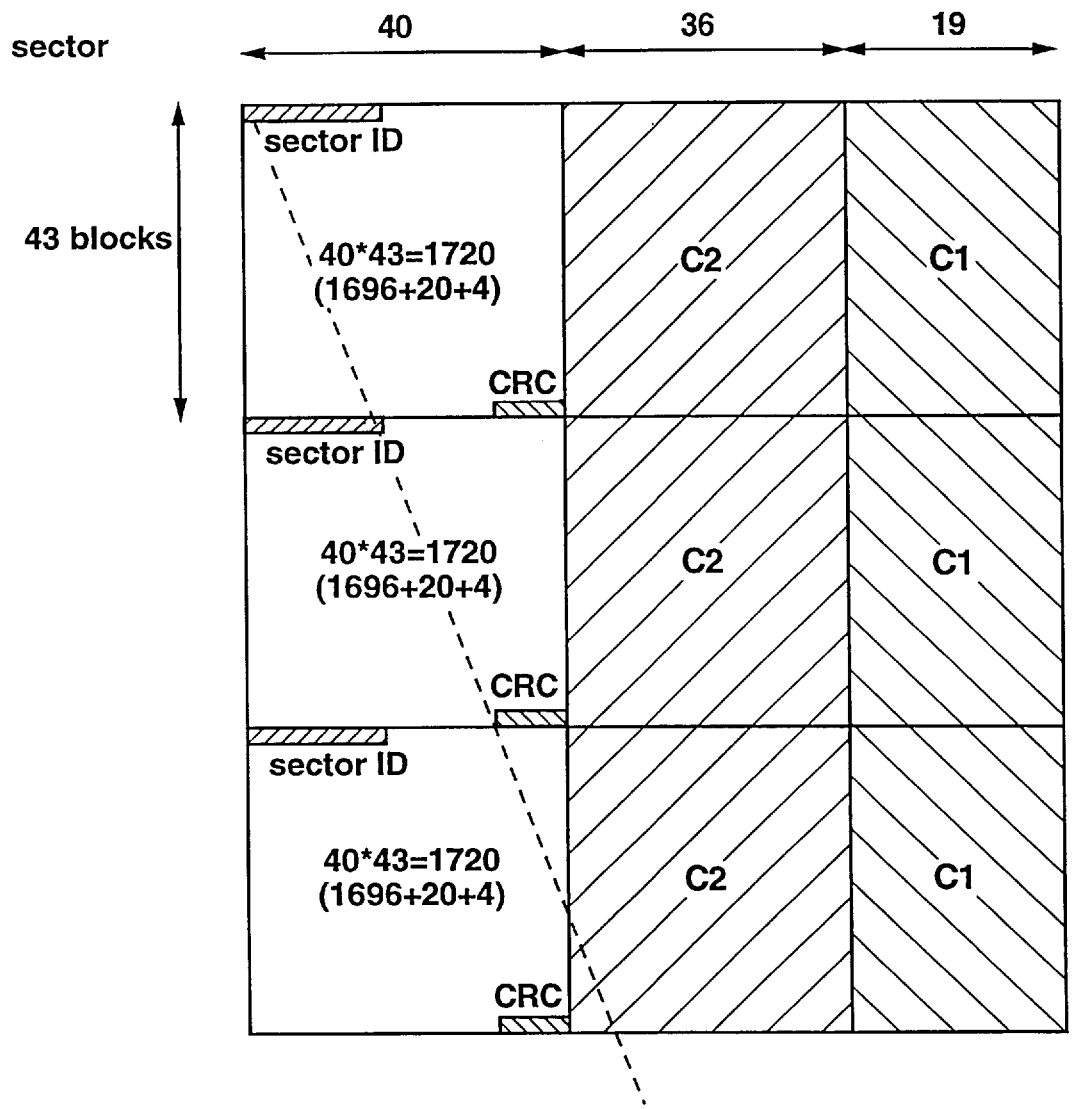
FIG. 7 shows how the coded digital sound signal, composed of the digital sound signals of plural channels and their associated error correction data, recorded on the motion picture film by the sound camera is divided into sectors.

The sector-forming circuit 55A and the sector-forming circuit 55B each form, from the compressed digital sound signals of four channels received from the signal compressing circuit 54A and the signal compressing circuit 54B, respectively, two-dimensional sectors of 40×43=1720 bytes, each sector consisting of 20 bytes of sector ID data, followed by 1696 bytes of the digital sound signals of the four channels, followed by 4 bytes of CRC data, as shown in FIG. 7.

The ECC encoder 56A and the ECC encoder 56B each generate, for each of the sectors formed by the sector-forming circuit 55A and by the sector-forming circuit 54B, respectively, 36-byte C2 parity data at an interval of 40 bytes in the oblique direction shown by the broken line in FIG. 7, and also form, for the same digital sound signals, 19-byte C1 parity data at an interval of 76 bytes in the horizontal direction shown in FIG. 7. The ECC encoders each array a number of bytes of the digital sound signal with their respective parity data as shown in FIG. 7 to generate a coded digital sound signal divided into the sectors. Each sector is composed of 1696 bytes of the digital sound signals of the four channels, together with their respective sector ID data, CRC data, C2 parity data and C1 parity data, as shown in FIG. 7.

The modulating circuit 57A and the modulating circuit 57B each convert the each byte of the coded digital sound signal from the ECC encoder 56A and the ECC encoder 56B, respectively, by 8–9 conversion into a respective dot pattern in which each byte of the coded digital sound signal is represented by an array of 3×3=9 dots. In the present embodiment, the converting circuits 57A and 57B perform the 8–9 conversion in accordance with conversion tables shown in Tables 1 to 4 to convert each byte of the coded digital sound signal into a two-dimensional dot pattern represented by 3×3 channel bits. The tracking patterns are appended to the dot pattern of each track, and the coded digital sound signal for the signal pattern area is modulated by non-return-to-zero inverted (NRZI) modulation system to generate the dot-pattern signal for recording on the motion picture film.

Figure 8:
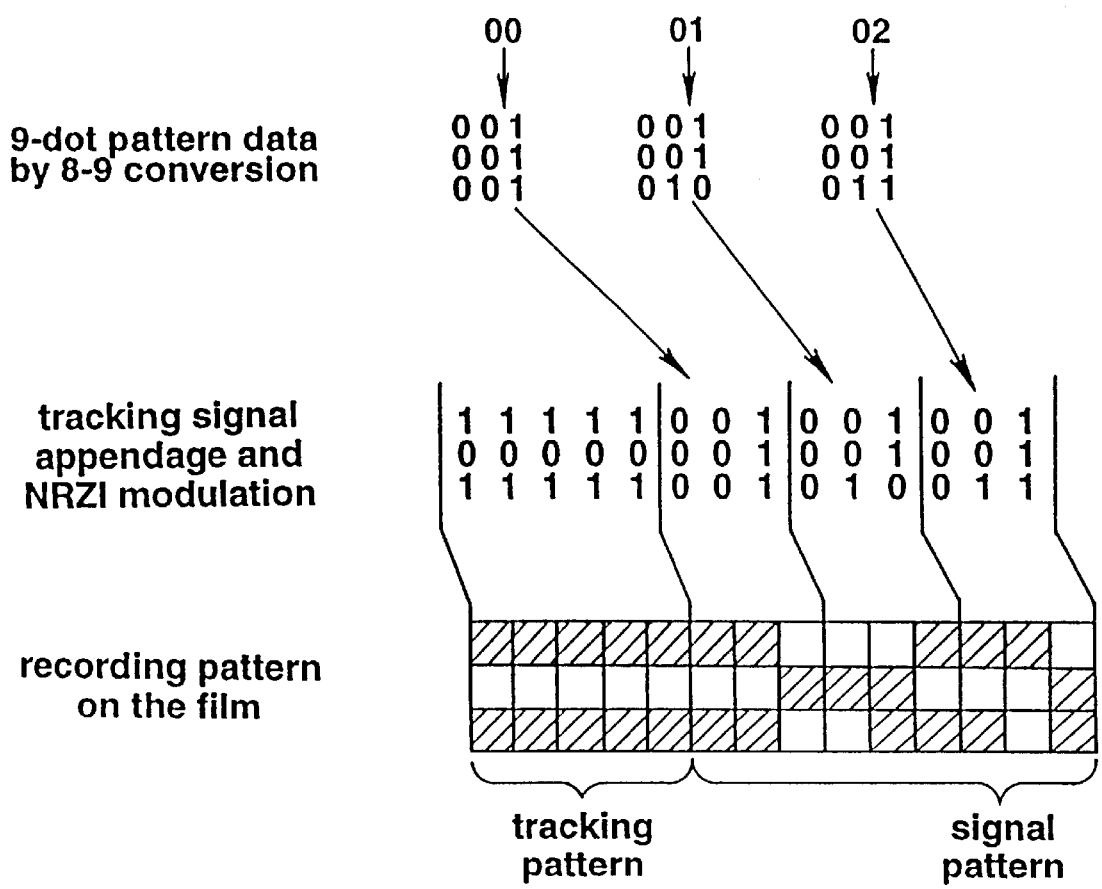
FIG. 8 illustrates the process of generating dot patterns by 8–9 conversion of the coded digital sound signal prior to the sound camera shown in FIG. 6 recording the dot-pattern signal on the motion picture film.

FIG. 8 illustrates a specific example of the process of generating the dot pattern from data having the illustrated byte values of the coded digital sound signal.

TABLE 1

| input | output (9-dot patterns) | input | output (9-dot patterns) |
|---|---|---|---|
| 00 | 049(001:001:001) | 20 | 06D(001:101:101) |
| 01 | 04A(001:001:010) | 21 | 06E(001:101:110) |
| 02 | 04B(001:001:011) | 22 | 077(001:110:111) |
| 03 | 04C(001:001:100) | 23 | 071(001:110:001) |
| 04 | 04D(001:001:101) | 24 | 072(001:110:010) |
| 05 | 04E(001:001:110) | 25 | 073(001:110:011) |
| 06 | 057(001:010:111) | 26 | 074(001:110:100) |
| 07 | 051(001:010:001) | 27 | 075(001:110:101) |
| 08 | 052(001:010:010) | 28 | 076(001:110:110) |
| 09 | 053(001:010:011) | 29 | 0BF(010:111:111) |
| 0A | 054(001:010:100) | 2A | 0B9(010:111:001) |
| 0B | 055(001:010:101) | 2B | 0BA(010:111:010) |
| 0C | 056(001:010:110) | 2C | 0BB(010:111:011) |
| 0D | 05F(001:011:111) | 2D | 0BC(010:111:100) |
| 0E | 059(001:011:001) | 2E | 0BD(010:111:101) |
| 0F | 05A(001:011:010) | 2F | 0BE(010:111:110) |
| 10 | 05B(001:011:011) | 30 | 08F(010:001:111) |
| 11 | 05C(001:011:100) | 31 | 089(010:001:001) |
| 12 | 05D(001:011:101) | 32 | 08A(010:001:010) |
| 13 | 05E(001:011:110) | 33 | 08B(010:001:011) |
| 14 | 067(001:100:111) | 34 | 08C(010:001:100) |
| 15 | 061(001:100:001) | 35 | 08D(010:001:101) |
| 16 | 062(001:100:010) | 36 | 08E(001:001:110) |
| 17 | 063(001:100:011) | 37 | 097(010:010:111) |
| 18 | 064(001:100:100) | 38 | 091(010:010:001) |

TABLE 1-continued

| input | output (9-dot patterns) | input | output (9-dot patterns) |
|---|---|---|---|
| 19 | 065(001:100:101) | 39 | 092(010:010:010) |
| 1A | 066(001:100:110) | 3A | 093(010:010:011) |
| 1B | 06F(001:101:111) | 3B | 094(010:010:100) |
| 1C | 069(001:101:001) | 3C | 095(010:010:101) |
| 1D | 06A(001:101:010) | 3D | 096(010:010:110) |
| 1E | 06B(001:101:011) | 3E | 09F(010:011:111) |
| 1F | 06C(001:101:100) | 3F | 099(010:011:001) |

TABLE 2

| input | output (9-dot patterns) | input | output (9-dot patterns) |
|---|---|---|---|
| 40 | 09A(010:011:010) | 60 | 0FE(011:111:110) |
| 41 | 09B(010:011:011) | 61 | 0CF(011:001:111) |
| 42 | 09C(010:011:100) | 62 | 0C9(011:001:001) |
| 43 | 09D(010:011:101) | 63 | 0CA(011:001:010) |
| 44 | 09E(010:011:110) | 64 | 0CB(011:001:011) |
| 45 | 0A7(010:100:111) | 65 | 0CC(011:001:100) |
| 46 | 0A1(010:100:001) | 66 | 0CD(011:001:101) |
| 47 | 0A2(010:100:010) | 67 | 0CB(011:001:110) |
| 48 | 0A3(010:100:011) | 68 | 0D7(011:010:111) |
| 49 | 0A4(010:100:100) | 69 | 0D1(011:010:001) |
| 4A | 0A5(010:100:101) | 6A | 0D2(011:010:010) |
| 4B | 0A6(010:100:110) | 6B | 0D3(011:010:011) |
| 4C | 0AF(010:101:111) | 6C | 0D4(011:010:100) |
| 4D | 0A9(010:101:001) | 6D | 0D5(011:010:101) |
| 4E | 0AA(010:101:010) | 6E | 0D6(011:010:110) |
| 4F | 0AB(010:101:011) | 6F | 0DF(011:011:111) |
| 50 | 0AC(010:101:100) | 70 | 0D9(011:011:001) |
| 51 | 0AD(010:101:101) | 71 | 0DA(011:011:010) |
| 52 | 0AE(010:101:110) | 72 | 0DB(011:011:011) |
| 53 | 0B7(010:110:111) | 73 | 0DC(011:011:100) |
| 54 | 0B1(010:110:001) | 74 | 0DD(011:011:101) |
| 55 | 0B2(010:110:010) | 75 | 0DE(011:011:110) |
| 56 | 0B3(010:110:011) | 76 | 0E7(011:100:111) |
| 57 | 0B4(010:110:100) | 77 | 0E1(011:100:001) |
| 58 | 0B5(010:110:101) | 78 | 0E2(011:100:010) |
| 59 | 0B6(010:110:110) | 79 | 0E3(011:100:011) |
| 5A | 0FF(011:111:111) | 7A | 0E4(011:100:100) |
| 5B | 0F9(011:111:001) | 7B | 0E5(011:100:101) |
| 5C | 0FA(011:111:010) | 7C | 0E6(011:100:110) |
| 5D | 0FB(011:111:011) | 7D | 0EF(011:100:111) |
| 5E | 0FC(011:111:100) | 7E | 0E9(011:100:001) |
| 5F | 0FD(011:111:101) | 7F | 0EA(011:101:010) |

TABLE 3

| input | output (9-dot patterns) | input | output (9-dot patterns) |
|---|---|---|---|
| 80 | 0EB(011:101:011) | A0 | 11F(100:011:001) |
| 81 | 0BC(011:101:100) | A1 | 119(100:011:001) |
| 82 | 0ED(011:101:101) | A2 | 11A(100:011:010) |
| 83 | 0EE(011:101:110) | A3 | 11B(100:011:011) |
| 84 | 0F7(011:110:111) | A4 | 11C(100:011:100) |
| 85 | 0F1(011:110:001) | A5 | 11D(100:011:101) |
| 86 | 0F2(011:110:010) | A6 | 11E(100:011:110) |
| 87 | 0F3(011:110:011) | A7 | 127(100:100:111) |
| 88 | 0F4(011:110:100) | A8 | 121(100:100:001) |
| 89 | 0F5(011:110:101) | A9 | 122(100:100:010) |
| 8A | 0F6(011:110:110) | AA | 123(100:100:011) |
| 8B | 13F(100:111:111) | AB | 124(100:100:100) |
| 8C | 139(100:111:001) | AC | 125(100:100:101) |
| 8D | 13A(100:111:010) | AD | 126(100:100:110) |
| 8E | 13B(100:111:011) | AE | 12F(100:101:111) |
| 8F | 13C(100:111:100) | AF | 129(100:101:001) |
| 90 | 13D(100:111:101) | B0 | 12A(100:101:010) |
| 91 | 13E(100:111:110) | B1 | 12B(100:101:011) |
| 92 | 10F(100:001:111) | B2 | 12C(100:101:100) |
| 93 | 109(100:001:001) | B3 | 12D(100:101:101) |
| 94 | 10A(100:001:010) | B4 | 12E(100:101:110) |
| 95 | 10B(100:001:011) | B5 | 137(100:110:111) |
| 96 | 10C(100:001:100) | B6 | 131(100:110:001) |

TABLE 3-continued

| input | output (9-dot patterns) | input | output (9-dot patterns) |
|---|---|---|---|
| 97 | 10D(100:001:101) | B7 | 132(100:110:010) |
| 98 | 10E(100:001:110) | B8 | 133(100:110:011) |
| 99 | 117(100:010:111) | B9 | 134(100:110:100) |
| 9A | 111(100:010:001) | BA | 135(100:110:101) |
| 9B | 112(100:010:010) | BB | 136(100:110:110) |
| 9C | 113(100:010:011) | BC | 17F(101:111:111) |
| 9D | 114(100:010:100) | BD | 179(101:111:001) |
| 9E | 115(100:010:101) | BE | 17A(101:111:010) |
| 9F | 116(100:010:110) | BF | 17B(101:111:011) |

TABLE 4

| input | output (9-dot patterns) | input | output (9-dot patterns) |
|---|---|---|---|
| C0 | 17C(101:111:100) | E0 | 169(101:101:001) |
| C1 | 17D(101:111:101) | E1 | 16A(101:101:010) |
| C2 | 17E(101:111:110) | E2 | 16B(101:101:011) |
| C3 | 14F(101:001:111) | E3 | 16C(10:101:100) |
| C4 | 149(101:001:001) | E4 | 16D(101:101:101) |
| C5 | 14A(101:001:010) | E5 | 16E(101:101:110) |
| C6 | 14B(101:001:011) | E6 | 177(101:110:111) |
| C7 | 14C(101:001:100) | E7 | 171(101:110:001) |
| C8 | 14D(101:001:101) | E8 | 172(101:110:010) |
| C9 | 14E(101:001:110) | E9 | 173(101:110:011) |
| CA | 157(101:010:111) | EA | 174(101:110:100) |
| CB | 151(101:010:001) | EB | 175(101:110:101) |
| CC | 152(101:010:010) | EC | 176(101:110:110) |
| CD | 153(101:010:011) | ED | 1BF(110:111:111) |
| CE | 154(101:010:100) | EE | 1B9(110:111:001) |
| CF | 155(101:010:101) | EF | 1BA(110:111:010) |
| D0 | 156(101:010:110) | F0 | 1BB(110:111:011) |
| D1 | 15F(101:011:111) | F1 | 1BC(110:111:100) |
| D2 | 159(101:011:001) | F2 | 1BD(110:111:101) |
| D3 | 15A(101:011:010) | F3 | 1BE(110:111:110) |
| D4 | 15B(101:011:011) | F4 | 18F(110:001:111) |
| D5 | 15C(101:011:100) | F5 | 189(110:001:001) |
| D6 | 15D(101:011:101) | F6 | 18A(110:001:010) |
| D7 | 15E(101:011:110) | F7 | 18B(110:001:011) |
| D8 | 167(101:100:111) | F8 | 18C(110:001:100) |
| D9 | 161(101:100:001) | F9 | 18D(110:001:101) |
| DA | 162(101:100:010) | FA | 18E(110:001:110) |
| DB | 163(101:100:011) | FB | 197(110:010:111) |
| DC | 164(101:100:100) | FC | 191(110:010:001) |
| DD | 165(101:100:101) | FD | 192(110:010:010) |
| DE | 166(101:100:110) | FE | 193(110:010:011) |
| DF | 16F(101:101:111) | FF | 194(110:010:100) |

Figure 9:
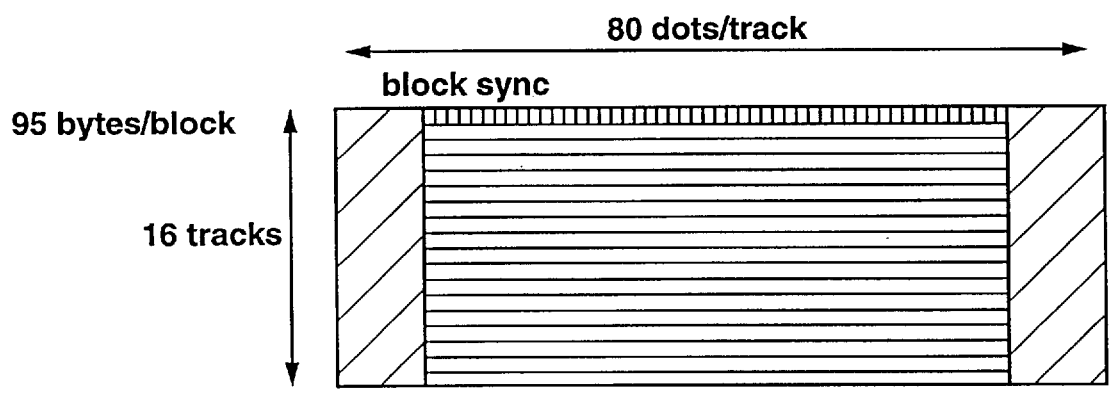
FIG. 9 shows how the dot patterns recorded on the motion picture film by the sound camera shown in FIG. 6 and representing the coded digital sound signal are divided into blocks.

In generating the dot-pattern signals, the modulating circuits 57A and 57B subdivide each sector of the coded digital sound signals into blocks, as shown in FIG. 9. Each block is composed of 40 bytes of the respective digital sound signal, sector ID data or CRC data, 36 bytes of the C2 parity data and 19 bytes of the C1 parity data, a total of 95 bytes. The modulating circuits 57A and 57B each generate a dot pattern consisting of 15 tracks each of 57 dots to represent the bytes in each 95-byte block. The modulating circuits begin and end each track with the tracking patterns of 11 dots and 12 dots respectively, making a total of 80 dots in each track, as shown in FIG. 2. Additionally, the modulating circuits 57A and 57B each generate a one-track block sync for the beginning of each block, making a total of 16 tracks in each block, as shown in FIG. 9.

Returning now to FIG. 6, the first and second optical recording units 52A and 52B are made up of the buffer memories 58A and 58B, the laser light sources 59A and 59B, the spatial modulators 60A and 60B and the image-forming lenses 69A and 69B, respectively.

The buffer memories 58A and 58B operate in response to a recording clock signal generated by the recording clock signal generator 70 to sequentially supply the dot-pattern signals from the first and second converting circuits 51A and 51B to the spatial modulators 60A and 60B. The spatial modulators 59A and 59B modulate the light from the laser light sources 59A and 59B in accordance with the respective dot-pattern signals. The light, modulated by the dot-pattern signals from the spatial modulators 60A and 60B, illuminates the digital sound tracks on the motion picture film 1 and causes dot patterns to be formed in the digital sound tracks.

Figure 10:
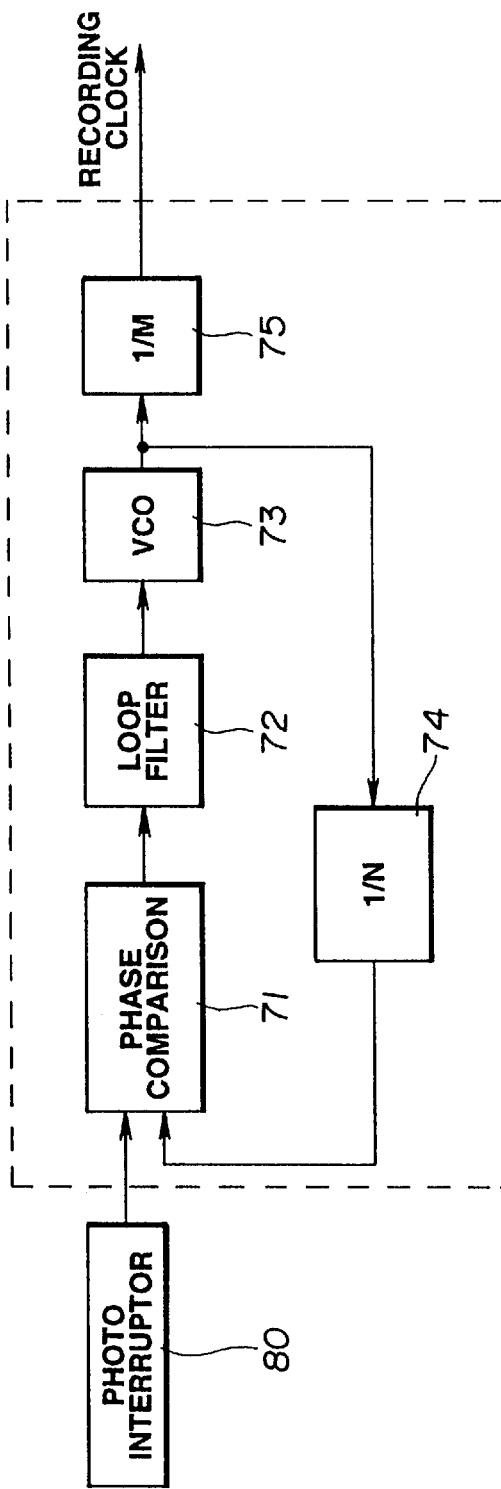
FIG. 10 is block diagram showing the practical arrangement of the recording clock signal generator in the sound camera.

FIG. 10 shows details of the recording clock signal generator 70, which uses a PLL circuit to generate a 44.1 kHz recording clock signal from a 96 Hz film speed clock signal generated by the passage detection type photointerruptor 80 detecting the passage of the sprocket holes 3 (FIG. 1) as the motion picture film 1 advances through the sound camera. The recording clock signal generator also includes the phase comparator 71, the loop filter 72, the voltage-controlled oscillator 73, the divide-by-N frequency divider 74 and the divide-by-M frequency divider 75. The phase comparator 71 compares the phase of the 96 Hz film speed signal generated by the photointerruptor 80 with that of the signal generated by divide-by-N frequency division of the output of the voltage-controlled oscillator 73 by the divide-by-N frequency divider 74. The resulting error signal is fed via the loop filter 72 to the voltage-controlled oscillator 73 as a control voltage. The voltage-controlled oscillator 73 has its oscillation phase controlled by the control voltage. The voltage-controlled oscillator 73 generates an output signal having a frequency of M×44.1 kHz, which is frequency-divided by a factor of M by the divide-by-M frequency divider 75 to produce the 44.1 kHz recording clock signal.

Figure 11:
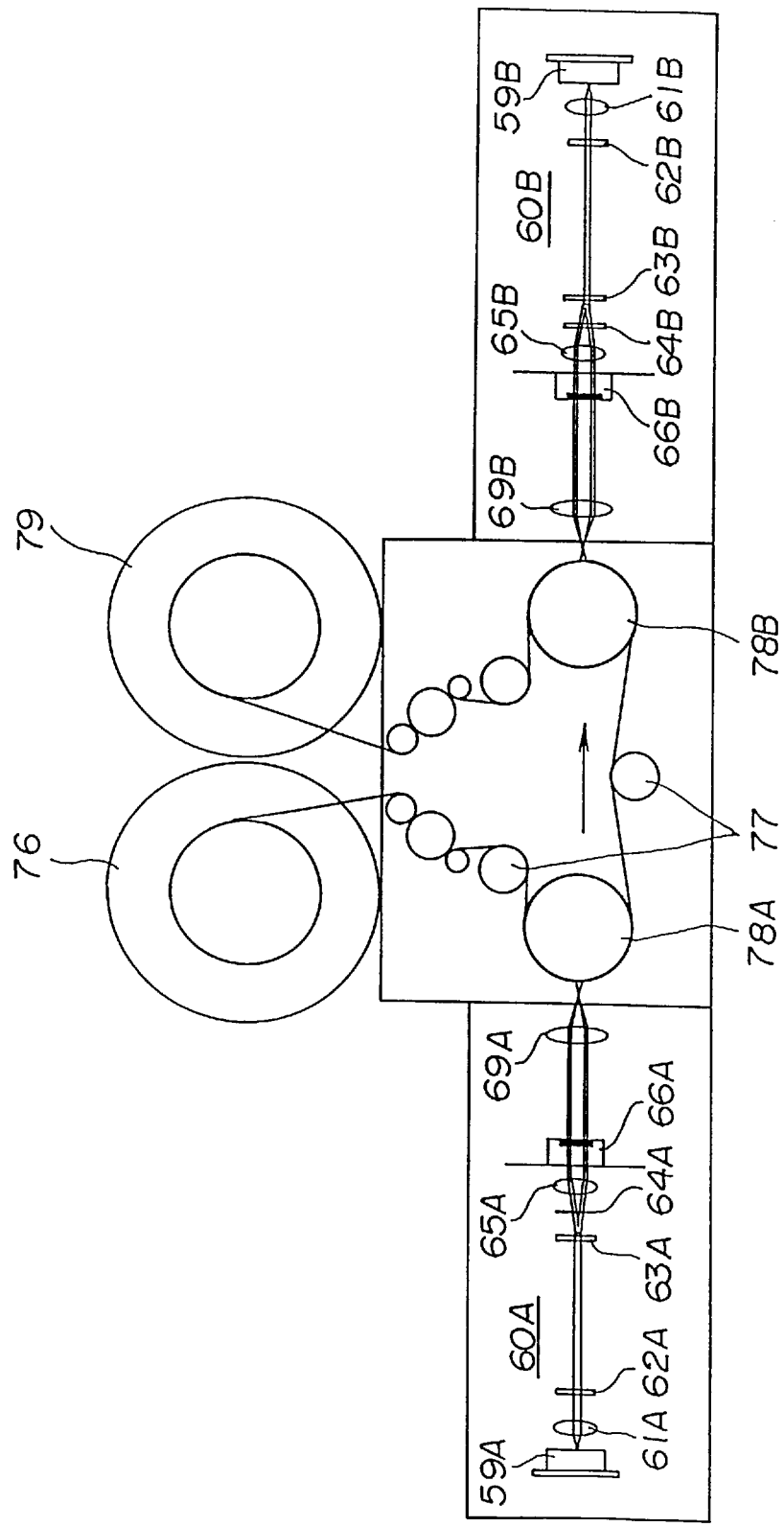
Fig. 11 is schematic plan view showing the practical arrangement of the spatial modulators of the first and second optical recording units of the sound camera shown in FIG. 6.
Figure 12:
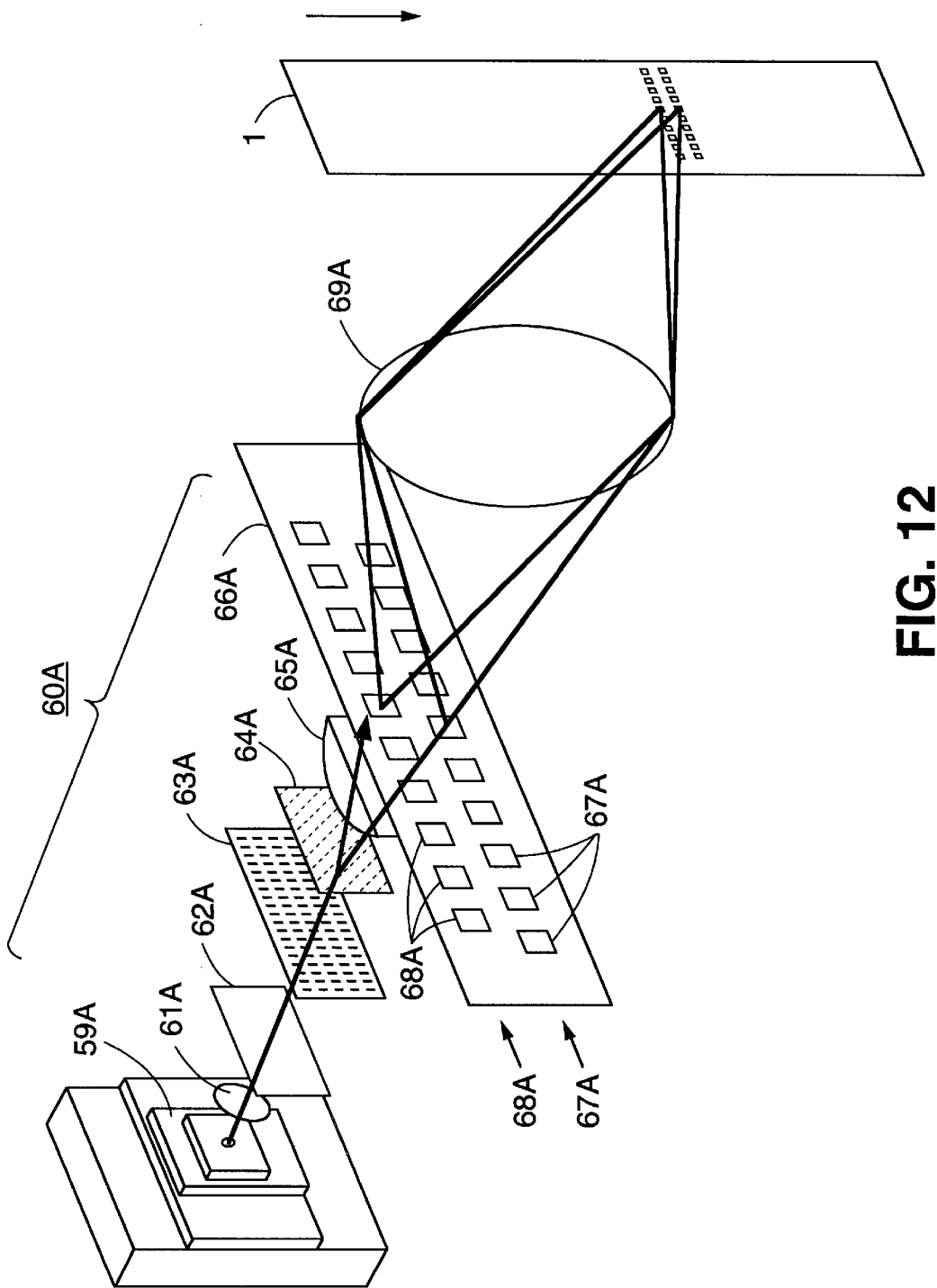
FIG. 12 is a schematic perspective view showing the arrangement of the spatial modulators.

Turning now to FIGS. 11 and 12, the spatial modulators 60A and 60B of the first and second optical recording units 52A and 52B are arranged facing each other and are made up of collimator lenses 61A and 61B, on which are incident the light beams from the laser light sources 59A and 59B, which are semiconductor lasers, the half-wave plates 62A and 62B, the diffraction gratings 63A and 63B, the polarizers 64A and 64B, the cylindrical lenses 65A and 65B and the shutter arrays 66A and 66B, respectively. The spatial modulator 60A is the left wing for the Cl track, while the spatial modulator 60B is the right wing for the Al track.

The motion picture film 1 is fed from the supply reel 76 of the film magazine and runs via the auxiliary roll 77 and the digital sound drums 78A and 78B before being taken up on the take-up reel 79.

FIG. 12 shows the shutter array 66A in more detail. In the shutter array 66A, the first aperture line 67A consists of a pre-set number of apertures 67a disposed in a straight line perpendicular to the direction of travel of the motion picture film 1. The second aperture line 68A consists of the same number of apertures 68a in a straight line. The apertures 67a and 68a of the first and second aperture lines 67A and 68A are arranged so that a land equal in width to the width of the apertures remains between adjacent apertures. The apertures 68a of the second aperture line 68A are positioned directly below the lands between the apertures of the first aperture line 67A. In other words, the apertures 67a of the first aperture line 67A are staggered by one aperture width with respect to the apertures 68a of the first aperture line 68A.

With the above-described arrangement of the spatial modulator 60A, when the recording of the digital sound signals is started, the motion picture film 1 is advanced in the direction shown by the arrow in FIG. 11, a light beam is generated by each semiconductor laser, and the dot-pattern signal is supplied from the buffer memory 58A to the shutter array 66A. The light beam generated by the laser light source 59A is collimated by the collimator lens 61A into a collimated light beam, which illuminates the diffraction grating 63A.

The position of the image of the light-emitting face of the semiconductor laser of the laser light source 59A formed by the collimator lens 61 A is set to be closer to the motion picture film 1 within the depth of focus. This causes the light beam to be transmitted through the shutter array 66A converging towards a focal point. Since the laser beam is a low coherency light, it is possible to prevent speckled noise from being produced if the image is substantially formed within the depth of focus. This means that the angle of field of the laser beam is narrowed as viewed from the imaging lens 69A. Consequently, the kick (reflection) of the laser beam within the imaging lens 69A as well as deterioration of the light intensity by images formed outside the optical axis and increases in aberration may be prevented from occurring to improve the image-forming properties.

The diffraction grating 63A is adjusted to cause a maximum amount of the first-order diffracted light to be radiated, so that the grating splits the incident light beam from the collimator lens 61A and the half wave plate 62A into first and second light beams as the positive and negative first order diffracted light beams which are incident via the polarizer plate 64A on the cylindrical lens 65A.

The cylindrical lens 65A refracts the first and second light beams to cause them to fall on the first and second aperture lines 67A and 68A of the shutter array 66A at a small angle of incidence.

The shutter array 66A transmits the first and second light beams respectively falling on the apertures 67a and 68a of the aperture lines 67A and 68A. However, the shutter array changes the phase of the light beams transmitted through the apertures 67a and 68a depending on the dot-pattern signal supplied by the buffer memory 58A. The apertures 67a and 68a use the so-called photoelectric effect to modulate the intensity of the light beams transmitted by the apertures, thereby converting the electrical dot-pattern signal into a spatial variation of light intensity. In the spatial modulator 66A, the dot-pattern signal drives the first and second aperture lines 67A and 68A with a preset time difference corresponding to the time required for the motion picture film 1 to advance by the width of one track of the digital sound track 6. Thus, the digital sound track of the motion picture film is alternately illuminated by the first and second light beams at the interval of the above-mentioned time difference. The first and second light beams having such modulated light intensities fall on the imaging lens 69A.

The amplitude of the dot-pattern signal supplied to the shutter array 66A is adjusted for each of the apertures 67a and 68a to make the first and second light beams radiated from the apertures 67a and 68a equal in intensity.

The imaging lens 69A converges the first and second light beams radiated from the apertures 67a and 68a of the shutter array 66A on the digital sound track 6 of the motion picture film 1 to form respective images of the apertures 67a and 68a.

Figure 13:
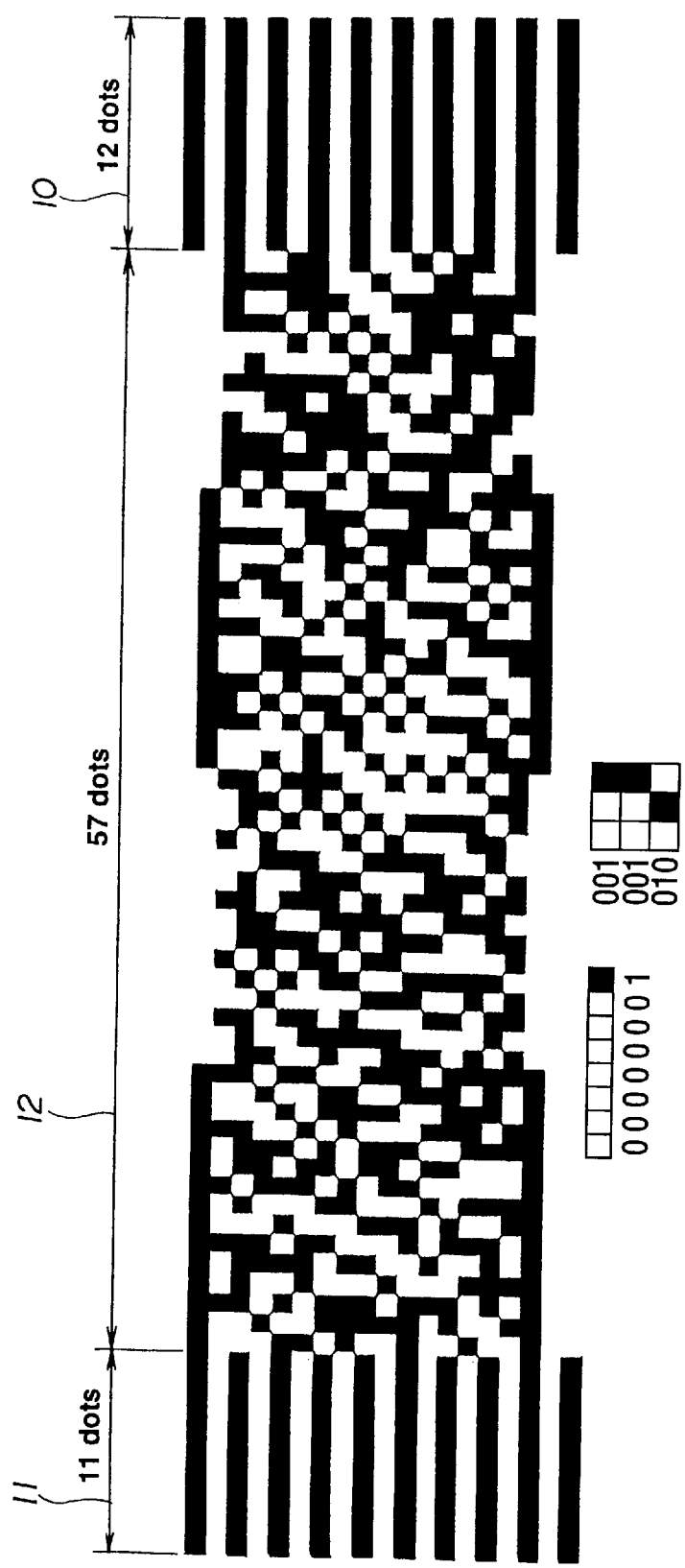
FIG. 13 shows the recording format of a motion picture film on which digital sound signals are recorded by the sound camera shown in FIG. 6.

Since the shutter array 66A transmits the first and second light beams alternately with a time delay, when the motion picture film 1 advances at a pre-set speed, the second light beam falls on the same row of the digital sound track as the first light beam. However, the apertures 67a of the shutter array 66A are laterally staggered relative to the apertures 68a. Consequently, the dot-pattern signal is recorded in such a manner that the part of the dot-pattern signal represented by the second light beam transmitted via the apertures 68a of the second aperture line 68A is interleaved between the part of the dot-pattern signal represented by the first light beam transmitted via the apertures 67a of the first aperture line 67A. The result is that there is no risk of adjacent dots overlapping even though the part of the dot-pattern signal represented by the first light beam and the part of the dot-pattern signal represented by the second light beam sequentially illuminate the same track. This enables the dot-pattern signal to be recorded in each track in the digital sound track 6 of the motion picture film 1 without gaps in the track direction, perpendicular to the direction of travel of the motion picture film, to provide high density dot patterns, as shown in FIG. 13.

Similarly, the optical recording unit 52B records the dot-pattern signal in each track of the digital sound track 5 of the motion picture film 1 without gaps in the track direction, perpendicular to the direction of travel of the motion picture film, to provide high density dot patterns.

Figure 14:
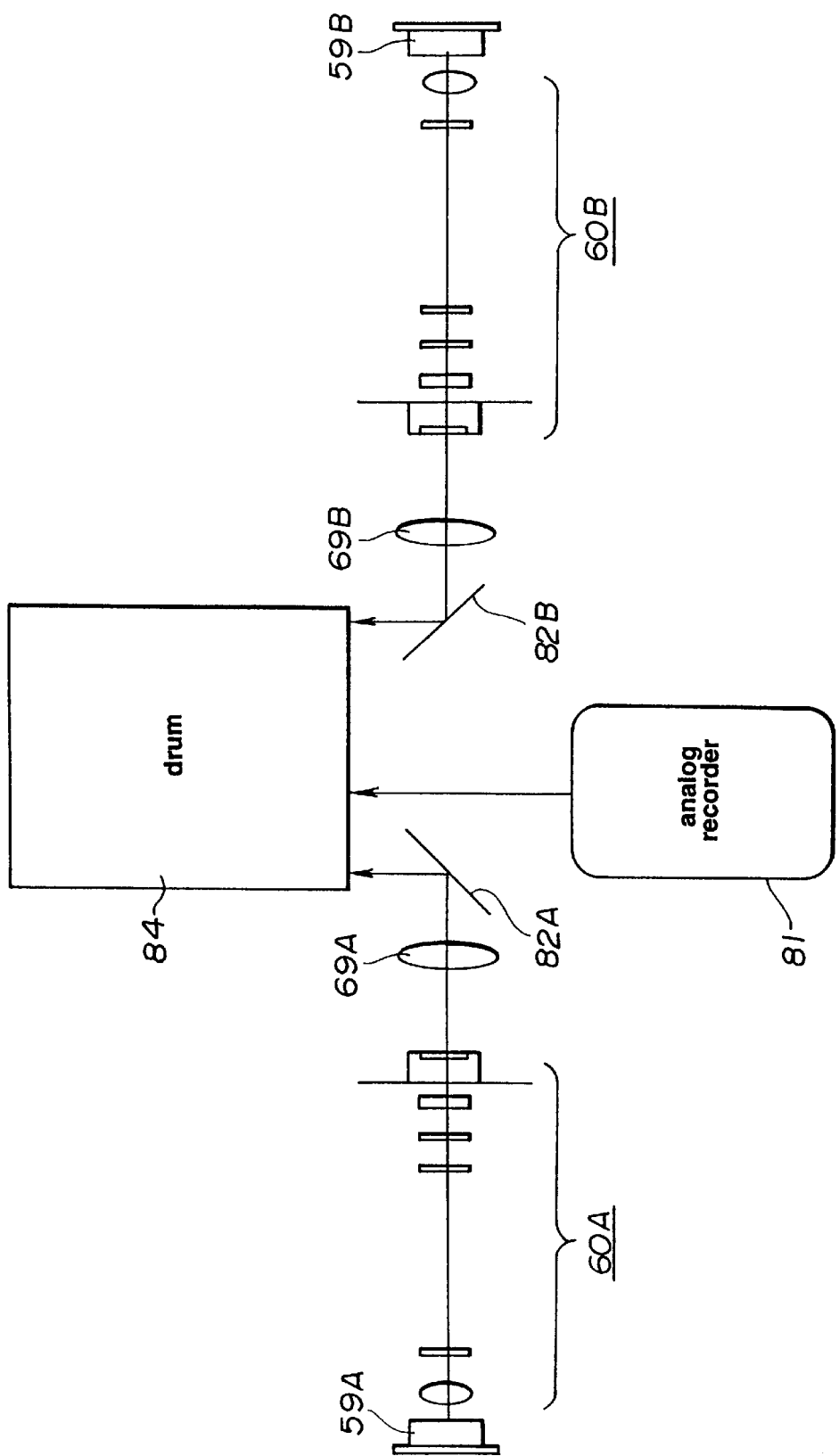
FIG. 14 is a diagrammatic plan view showing an alterative arrangement of the spatial modulators of the first and second optical recording units of the sound camera shown in FIG. 6.

Turning now to FIG. 14, the analog optical recording unit 81 for optically recording analog sound signals on the analog sound track 4 of the motion picture film 1 enables analog sound signals to be optically recorded in the analog sound track 4 of the motion picture film 1 (FIG. 1) while the digital sound signals are optically recorded in the digital sound tracks 5 and 6. FIG. 14 shows the mirrors 82A and 82B bending the optical path of the light from the spatial modulators 60A and 60B and the imaging lenses 69A and 69B through 90°. This makes the final directions of the optical axes of the analog optical recording unit 81 and the optical recording units 52A and 52B for recording the dot-pattern signals parallel to one another, so that the analog sound signals and the dot-pattern signals can be recorded simultaneously on the motion picture film 1 as the motion picture film passes round the sound drum 84.

Figure 15:
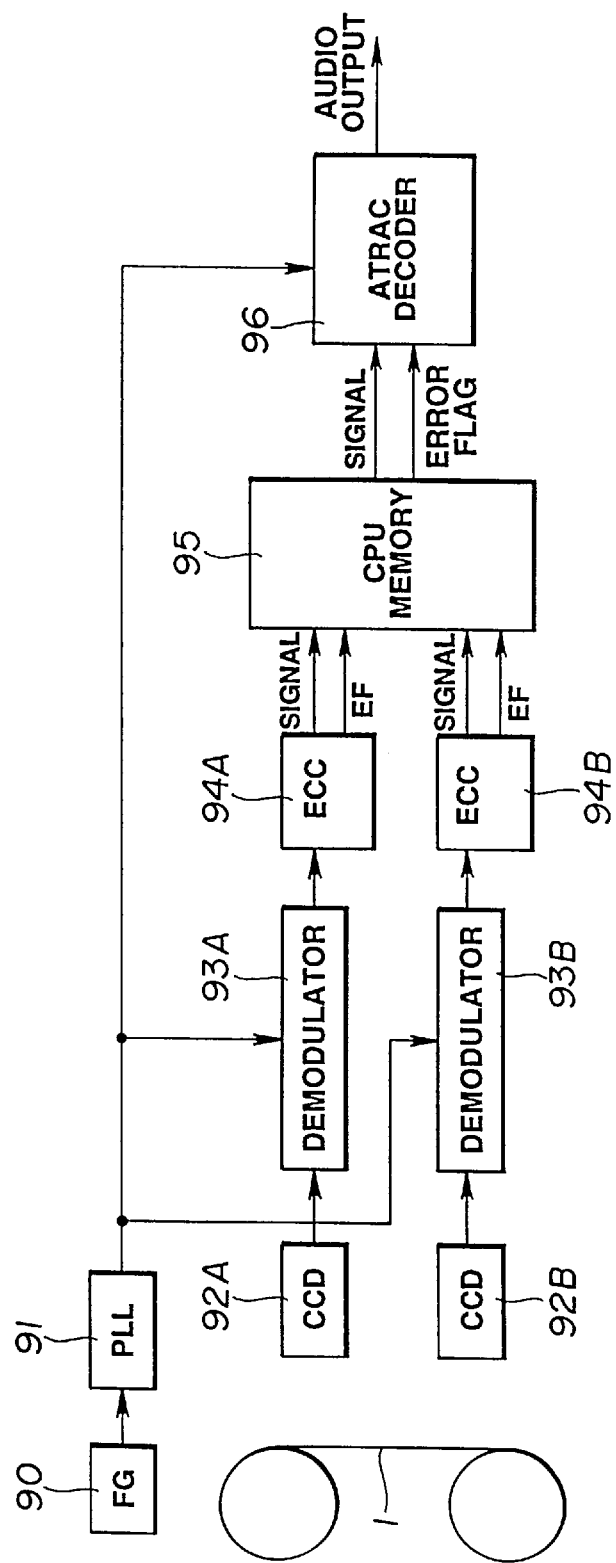
FIG. 15 is a block diagram showing the arrangement of the reproducing device for a motion picture film according to the present invention.

The playback device for the motion picture film according to the present invention is arranged as shown for example in FIG. 15.

The playback device for the motion picture film includes the transmission-type photointerrupter 90 for generating a film speed signal in response to the passage of the sprocket holes 3 (FIG. 1) of the motion picture film 1, and the playback clock signal generator 91. The playback clock signal generator generates a playback clock signal that is synchronized with the film speed signal generated by the photointerrupter 90 and has a frequency proportional to speed of travel of the motion picture film. The playback clock signal is used to read the dot-pattern signals from the digital sound tracks on the motion picture film. The dot patterns in the digital sound tracks 5 and 6 on the motion picture film 1 are read by the CCD line sensors 92A and 92B, and the resulting dot-pattern signal is processed using the playback clock signal to reproduce the original digital sound signals.

Similar to the recording clock signal generator 70 in the above-mentioned sound camera, the playback clock signal generator 91 uses a PLL circuit, not shown, to generate a 44.1 kHz playback clock signal synchronized with the 96 Hz film speed signal generated by the photointerrupter 90.

In the playback device for the motion picture film 1, the demodulating circuits 93A and 93B operate in response to the playback clock signal supplied by the playback clock signal generator 91 to perform 9–8 conversion on the respective dot-pattern signals generated by the CCD line sensors 92A and 92B respectively reading the dot patterns in the digital sound tracks 5 and 6 of the motion picture film 1. This 9–8 conversion corresponds to the 8–9 conversion performed in the modulating circuits 51A and 51B of the above-mentioned sound camera and demodulates each 9-dot pattern to recover one byte of the coded digital sound signal.

The error correction circuits 94A and 94B use the C1 parity data and the C2 parity data demodulated by the demodulating circuits 93A and 93B to correct errors in the reproduced coded digital sound signals and the resulting compressed digital sound signals and any respective error flags are stored in the memory 95.

The signal expander circuit 96 operates in response to the playback clock signals generated by the playback clock signal generator 91 to perform signal expansion complementary to the signal compression performed by the signal compression circuits 54A and 54B of the sound camera and to reproduce the digital sound signals of the respective channels.

Figure 16:
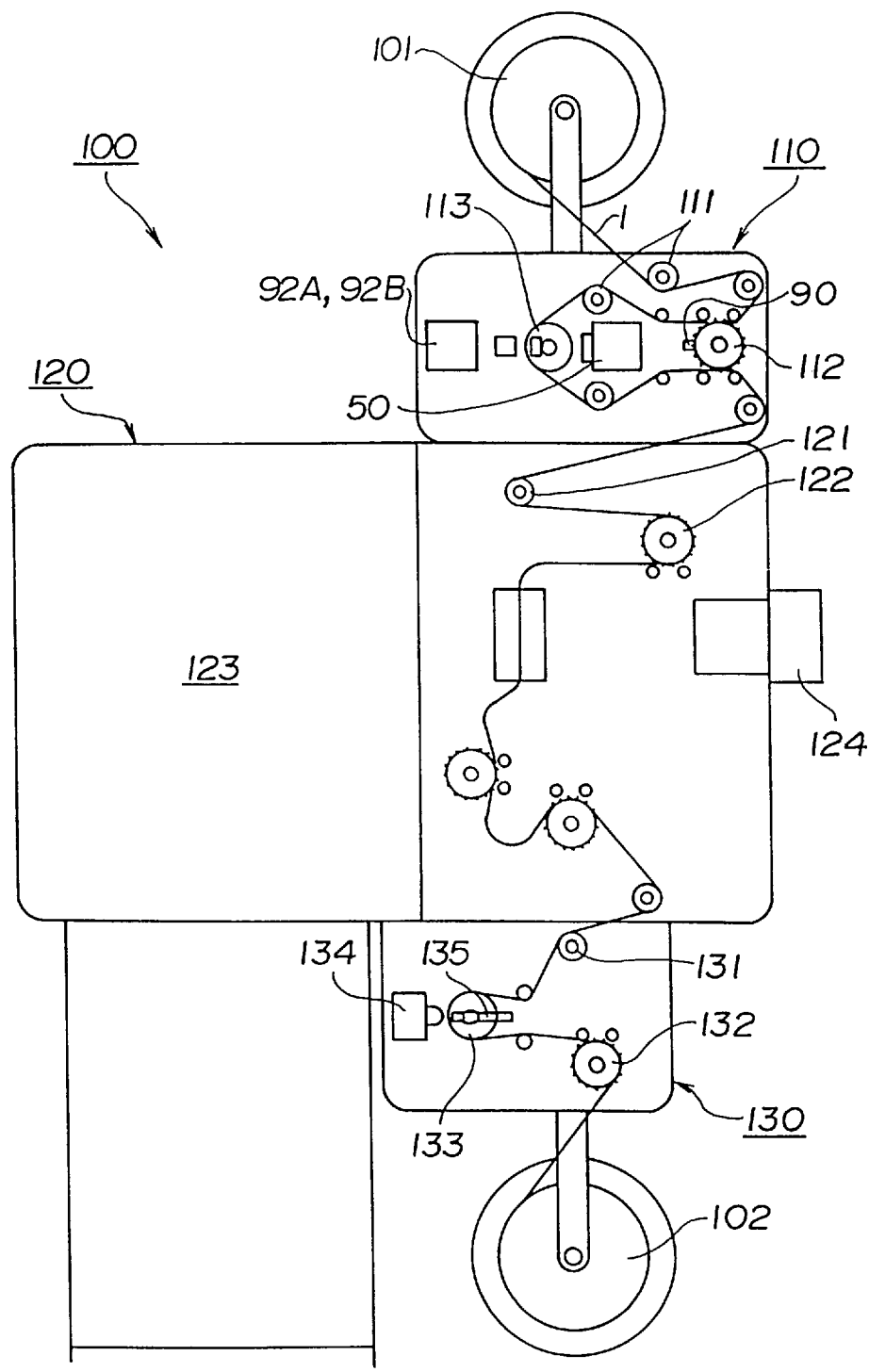
FIG. 16 shows the schematic arrangement of a motion picture projector equipped with the reproducing device for the motion picture film according to the present invention.

FIG. 16 shows the above-described reproducing device 110 of the present invention installed in the penthouse 103 of the projector 100.

In the projector 100, the motion picture film 1 unreels from the supply reel 101, is guided by the guide rolls 111, 121, and 131, the sprockets 112, 122, and 132 and the digital and analog sound drums 113 and 133, and passes via the digital sound unit 110, the picture projector 120, and the analog sound head 130 before being taken up by the take-up reel 102.

The motion picture film 1 runs through the digital sound unit guided by the guide rolls 111, the sprocket 112 and the guide drum 113. Light from the light source 50 illuminates the digital sound tracks 5 and 6 where the motion picture film 1 passes round the sound drum 113. The dot patterns in the digital sound tracks illuminated by light from the light source are read by the CCD line sensors 92A and 92B, which generate dot-pattern signals from which the audio signals of eight channels are reproduced.

In the present digital sound playback unit 110, the photointerruptor 90 generates the film speed signal with a frequency of about 96 Hz, proportional to the speed of travel of the motion picture film 1. The photointerruptor 90 generates the film speed signal by detecting the passage of the teeth of the sprocket 112 as it meshes with the sprocket holes 3 (FIG. 1) of the motion picture film 1, and supplies the film speed signal to the playback clock signal generator 91 of the playback system shown in FIG. 15.

The playback clock signal generator 91 generates, using a PLL circuit, not shown, the 44.1 kHz playback clock signal, synchronized with the 96 Hz film speed signal generated by the photointerruptor 90 detecting the passage of the teeth of the sprocket 112 meshing with the sprocket holes 3 of the motion picture film 1.

In the present digital sound unit 110, the demodulating circuits 93A and 93B operate in response to the playback clock signal supplied from the playback clock signal generator 91 to demodulate the dot-pattern signals generated by the CCD line sensors 92A and 92B reading the dot patterns in the respective digital sound tracks 5 and 6 of the motion picture film 1 to recover the respective coded digital sound signals that include the compressed digital sound signals of the respective channels. The error correction circuits 94A and 94B operate on the demodulated sector signals to apply error correction to the compressed digital sound signals therein to regenerate the compressed digital sound signals of the respective channels, which are stored in the memory 95. The signal expander circuit 96 operates in response to the playback clock signal generator 96 to apply signal expansion to the compressed digital sound signals stored in the memory 96 to reproduce the digital sound signals of the respective channels.

Figure 17:
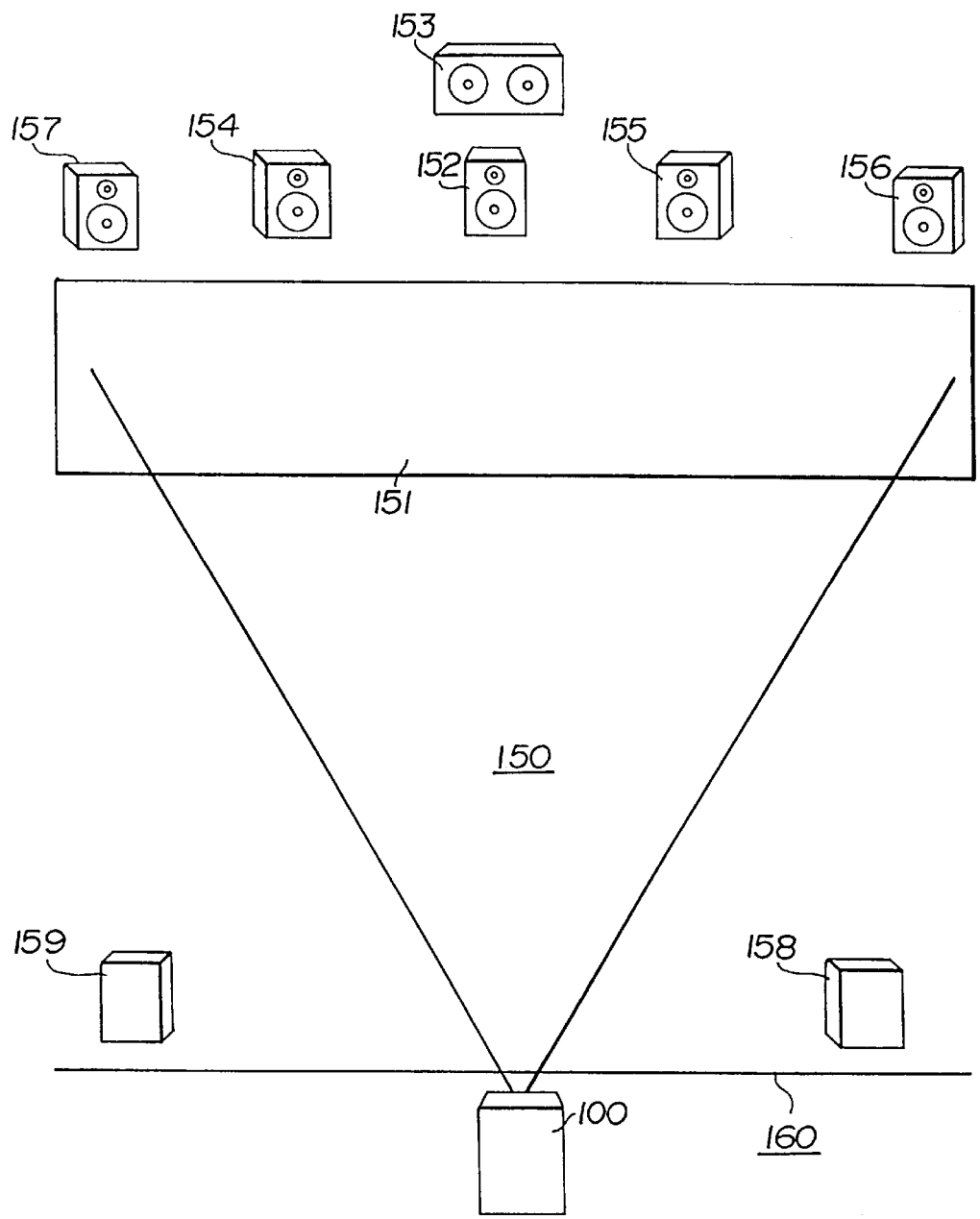
FIG. 17 is a schematic view showing a sound system with eight channels to which the digital sound signals reproduced by the reproducing device can be supplied.

The picture projector 120 in the projector 100 projects the pictures in the picture area 2 (FIG. 1) of the motion picture film 1 on a screen, such as the screen 151 shown in FIG. 17. The picture projector 120 illuminates the picture area 2 of the motion picture film 1, which is guided by the guide roll 121 and the sprocket 122, with light from the lamp house 123, and forms an image of each picture in the picture area on the screen using the projection lens 124. The analog sound unit 130 reproduces analog sound signals from the analog sound track 4 of the motion picture film 1. The motion picture film advances through the analog sound head 130 guided by the guide roll 131, the sprocket 132 and the analog sound drum 133. Light from the exciter lamp 134 illuminates the analog sound track 4 where the film wraps around the analog sound drum 134, and the light modulated by the analog sound track 4 falls on the solar cell 135, which generates analog signals in response thereto.

Among the digital sound signals of eight channels reproduced by the present reproducing device, the digital sound signals of six channels are for driving the center speaker 152, the sub-woofer 153, the center-left speaker 154, the center-right speaker 155, the right speaker 156 and the left speaker 157, arranged behind the screen 151 onto which the image of the picture area 2 of the motion picture film 1 is projected by the picture projector 120, and the digital sound signals of two channels are for driving the right-surround speakers 158 and the left-surround speakers 159 arranged on the back wall 160 and/or side walls of the auditorium 150, as shown in FIG. 17. The speakers 152 to 159 constitute a sound system that, when driven by the audio signals of eight channels, creates a sound field rich in ambience.

In the above-described embodiment, in each digital sound track 5 and 6 of the motion picture film 1, each track is made up of 80 dots, and each block is made up of 16 tracks, the first of which is a block sync track, as shown in FIG. 9. However, each track may alternatively be made up of 88 dots, and each block may be made up of 48 tracks, of which the first three are block sync tracks, as shown for example in FIG. 18.

Figure 18:
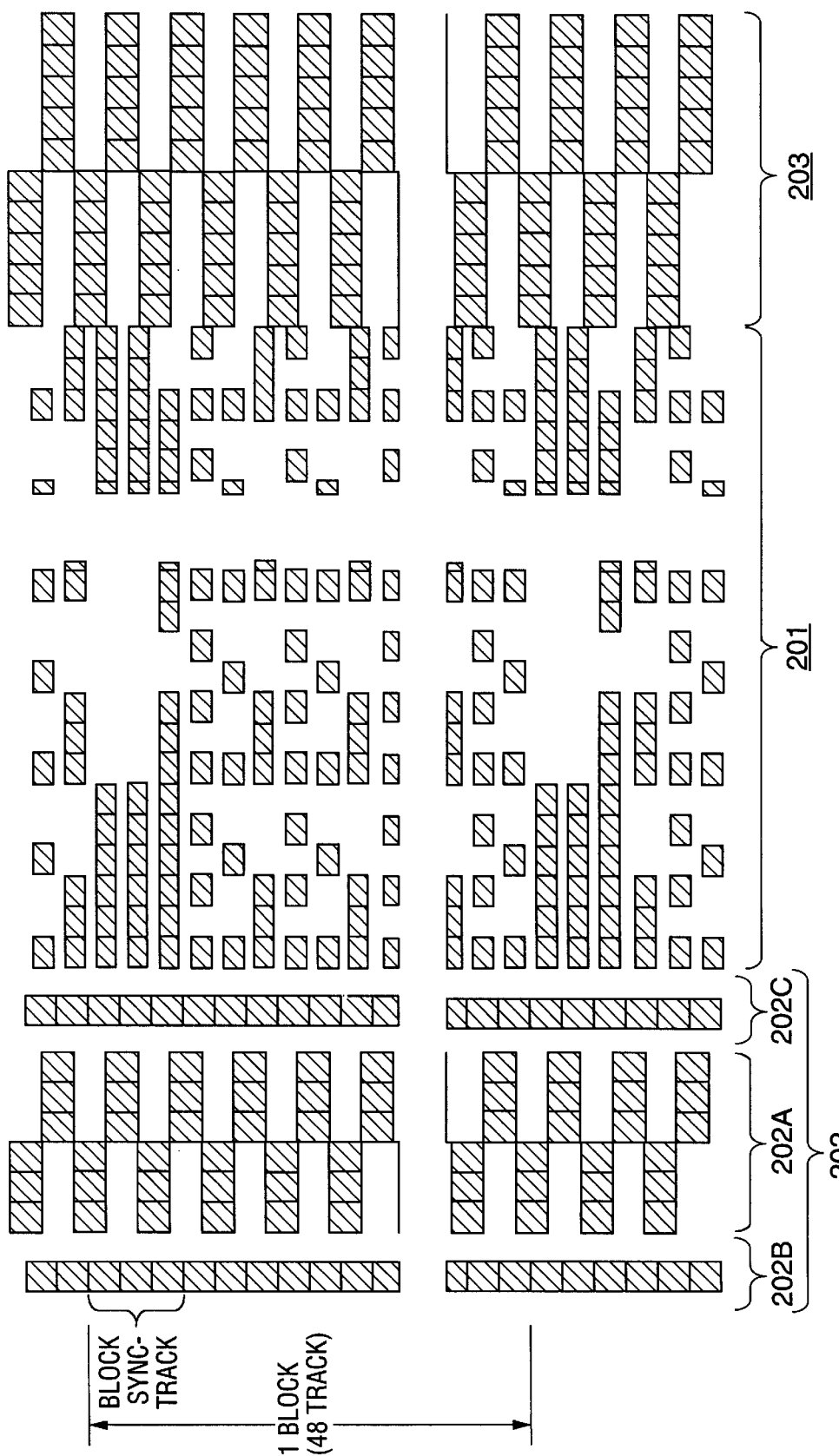
FIG. 18 is an enlarged view showing the digital pattern recorded in the digital sound tracks of a motion picture film according to a modified embodiment of the present invention.

In the digital sound track shown in FIG. 18, each track is made up of the 66-dot signal pattern area 201, and the 12-dot tracking pattern area 202 and the 10-dot tracking pattern area 203 formed adjacent the opposite edges of the signal pattern area 201.

In the signal pattern area 201, each byte of the coded digital audio signal is represented by a 3 dot ×3 track two-dimensional array of dots. The bytes of the digital sound signals and their appended error detection and correction data are converted by 8–9 conversion in accordance with the conversion tables shown in Tables 5 to 8 to generate the two-dimensional dot patterns in which each byte is represented by nine dots.

TABLE 5

| input | output (9 dot-patterns) | input | output (9-dot patterns) |
|---|---|---|---|
| 00 | 100:100:100 | 20 | 101:101:100 |
| 01 | 010:100:100 | 21 | 011:101:100 |
| 02 | 110:100:100 | 22 | 111:101:100 |
| 03 | 001:100:100 | 23 | 100:101:100 |

TABLE 5-continued

| input | output (9 dot-patterns) | input | output (9-dot patterns) |
|---|---|---|---|
| 04 | 101:100:100 | 24 | 010:011:100 |
| 05 | 011:100:100 | 25 | 110:011:100 |
| 06 | 111:010:100 | 26 | 001:011:100 |
| 07 | 100:010:100 | 27 | 101:011:100 |
| 08 | 010:010:100 | 28 | 011:011:100 |
| 09 | 110:010:100 | 29 | 111:011:100 |
| 0A | 001:010:100 | 2A | 100:111:100 |
| 0B | 101:010:100 | 2B | 010:111:100 |
| 0C | 011:010:100 | 2C | 110:111:100 |
| 0D | 111:010:100 | 2D | 001:111:100 |
| 0E | 100:110:100 | 2E | 101:111:100 |
| 0F | 010:110:100 | 2F | 011:111:100 |
| 10 | 110:110:100 | 30 | 111:111:100 |
| 11 | 001:110:100 | 31 | 100:100:010 |
| 12 | 101:110:100 | 32 | 010:100:010 |
| 13 | 011:110:100 | 33 | 110:100:010 |
| 14 | 111:110:100 | 34 | 001:100:010 |
| 15 | 100:101:100 | 35 | 101:100:010 |
| 16 | 010:101:100 | 36 | 011:010:010 |
| 17 | 110:101:100 | 37 | 111:010:010 |
| 18 | 001:101:100 | 38 | 100:010:010 |
| 19 | 101:101:100 | 39 | 010:010:010 |
| 1A | 011:101:100 | 3A | 110:010:010 |
| 1B | 111:101:100 | 3B | 001:010:010 |
| 1C | 100:101:100 | 3C | 101:010:010 |
| 1D | 010:101:100 | 3D | 011:010:010 |
| 1E | 110:101:100 | 3B | 111:010:010 |
| 1F | 001:101:100 | 3F | 100:110:010 |

TABLE 6

| input | output (9 dot-patterns) | input | output (9-dot patterns) |
|---|---|---|---|
| 40 | 010:110:010 | 60 | 011:111:010 |
| 41 | 110:110:010 | 61 | 111:111:010 |
| 42 | 001:110:010 | 62 | 100:100:110 |
| 43 | 101:110:010 | 63 | 010:100:110 |
| 44 | 011:110:010 | 64 | 110:100:110 |
| 45 | 111:110:010 | 65 | 001:100:110 |
| 46 | 100:001:010 | 66 | 101:100:110 |
| 47 | 010:001:010 | 67 | 011:100:110 |
| 48 | 110:001:010 | 68 | 111:100:110 |
| 49 | 001:001:010 | 69 | 100:010:110 |
| 4A | 101:001:010 | 6A | 010:010:110 |
| 4B | 011:001:010 | 6B | 110:010:110 |
| 4C | 111:001:010 | 6C | 001:010:110 |
| 4D | 100:101:010 | 6D | 101:010:110 |
| 4E | 010:101:010 | 6E | 011:010:110 |
| 4F | 110:101:010 | 6F | 111:010:110 |
| 50 | 001:101:010 | 70 | 100:110:110 |
| 51 | 101:110:010 | 71 | 010:110:110 |
| 52 | 011:110:010 | 72 | 110:110:110 |
| 53 | 111:110:010 | 73 | 001:110:110 |
| 54 | 100:011:010 | 74 | 101:110:110 |
| 55 | 010:011:010 | 75 | 011:110:110 |
| 56 | 110:011:010 | 76 | 111:110:110 |
| 57 | 001:011:010 | 77 | 100:001:110 |
| 58 | 101:011:010 | 78 | 010:001:110 |
| 59 | 011:011:010 | 79 | 110:001:110 |
| 5A | 111:011:010 | 7A | 001:001:110 |
| 5B | 100:111:010 | 7B | 101:001:110 |
| 5C | 010:111:010 | 7C | 011:001:110 |
| 5D | 110:111:010 | 7D | 111:001:110 |
| 5E | 001:111:010 | 7E | 100:101:110 |
| 5F | 101:111:010 | 7F | 010:101:110 |

TABLE 7

| input | output (9 dot-patterns) | input | output (9-dot patterns) |
|---|---|---|---|
| 80 | 110:101:110 | A0 | 111:010:001 |
| 81 | 001:101:110 | A1 | 100:110:001 |
| 82 | 101:101:110 | A2 | 010:110:001 |
| 83 | 011:101:110 | A3 | 110:110:001 |
| 84 | 111:101:110 | A4 | 001:110:001 |
| 85 | 100:011:110 | A5 | 101:110:001 |
| 86 | 010:011:110 | A6 | 011:110:001 |
| 87 | 110:011:110 | A7 | 111:110:001 |
| 88 | 001:011:110 | A8 | 100:001:001 |
| 89 | 101:011:110 | A9 | 010:001:001 |
| 8A | 011:011:110 | AA | 110:001:001 |
| 8B | 111:011:110 | AB | 001:001:001 |
| 8C | 100:111:110 | AC | 101:001:001 |
| 8D | 010:111:110 | AD | 011:001:001 |
| 8E | 110:111:110 | AE | 111:001:001 |
| 8F | 001:111:110 | AF | 100:101:001 |
| 90 | 101:111:110 | B0 | 010:101:001 |
| 91 | 011:111:110 | B1 | 110:101:001 |
| 92 | 111:111:110 | B2 | 001:101:001 |
| 93 | 100:100:001 | B3 | 101:101:001 |
| 94 | 010:100:001 | B4 | 011:101:001 |
| 95 | 110:100:001 | B5 | 111:101:001 |
| 96 | 001:100:001 | B6 | 100:011:001 |
| 97 | 101:100:001 | B7 | 010:011:001 |
| 98 | 011:100:001 | B8 | 110:011:001 |
| 99 | 111:100:001 | B9 | 001:011:001 |
| 9A | 100:010:001 | BA | 101:011:001 |
| 9B | 010:010:001 | BB | 011:011:001 |
| 9C | 110:010:001 | BC | 111:011:001 |
| 9D | 001:010:001 | BD | 100:111:001 |
| 9E | 101:010:001 | BE | 010:111:001 |
| 9F | 011:010:001 | BF | 110:111:001 |

TABLE 8

| input | output (9 dot-patterns) | input | output (9-dot patterns) |
|---|---|---|---|
| C0 | 001:111:001 | B0 | 100:101:101 |
| C1 | 101:111:001 | E1 | 010:101:101 |
| C2 | 011:111:001 | E2 | 110:101:101 |
| C3 | 111:111:001 | E3 | 001:101:101 |
| C4 | 100:100:001 | E4 | 101:101:101 |
| C5 | 010:100:001 | E5 | 011:101:101 |
| C6 | 110:100:101 | E6 | 111:101:101 |
| C7 | 001:100:101 | E7 | 100:011:101 |
| C8 | 101:100:101 | E8 | 010:011:101 |
| C9 | 011:100:101 | E9 | 110:011:101 |
| CA | 111:100:101 | EA | 001:011:101 |
| CB | 100:010:101 | EB | 101:011:101 |
| CC | 010:010:101 | EC | 011:011:101 |
| CD | 110:010:101 | ED | 111:011:101 |
| CE | 001:010:101 | EE | 100:111:101 |
| CF | 101:010:101 | EF | 010:111:101 |
| D0 | 011:010:101 | F0 | 110:111:101 |
| D1 | 111:010:101 | F1 | 001:111:101 |
| D2 | 100:110:101 | F2 | 101:111:101 |
| D3 | 010:110:101 | F3 | 011:111:101 |
| D4 | 110:110:101 | F4 | 111:111:101 |
| D5 | 001:110:101 | F5 | 100:100:011 |
| D6 | 101:110:101 | F6 | 010:100:011 |
| D7 | 011:110:101 | F7 | 110:100:011 |
| D8 | 111:110:101 | F8 | 001:100:011 |
| D9 | 100:001:101 | F9 | 101:100:011 |
| DA | 010:001:101 | FA | 011:100:011 |
| DB | 110:001:101 | FB | 111:100:011 |
| DC | 001:001:101 | FC | 100:010:011 |
| DD | 101:001:101 | FD | 010:010:011 |
| DE | 011:001:101 | FE | 110:010:011 |
| DF | 111:001:101 | FF | 001:010:011 |

The 12-dot tracking pattern area 202 is made up of the 6-dot vertical synchronizing pattern area 202A and 3-dot horizontal synchronizing pattern areas 202B and 202C adjacent the opposite edges of the vertical synchronizing pattern area 202A. In the vertical synchronizing pattern area 202A, a first 3-dot string extending parallel to the tracks of the signal pattern area 201 is arranged for every other track of the signal pattern area. The first 3-dot string has a phase shifted by half a track relative to the respective track of the signal pattern area. Also in the vertical synchronizing pattern area 202A, a second 3-dot string extending parallel to the tracks of the signal pattern area 201 is arranged for every other track of the signal pattern area at a phase-inverted position with respect to the first 3-dot string. A number of these first and second 3-dot strings makes up the vertical synchronizing pattern.

In the horizontal synchronizing pattern areas 202B and 202C, dot strings are arrayed perpendicular to the tracks of the signal pattern area 201 as a horizontal synchronizing pattern.

In the 10-dot tracking pattern area 203, a first 5-dot string extending parallel to the tracks of the signal pattern area 201 is arranged for every other track of the signal pattern area. The first 5-dot string has a phase shift of one half a track relative to the associated track of the signal pattern area. Also in the 10-dot tracking pattern area 203, a second 5-dot string extending parallel to the tracks of the signal pattern area 201 is arranged for every other track of the signal pattern area at a phase-inverted position with respect to the first 5-dot string. A number of these first and second 5-dot strings makes up a second vertical synchronizing pattern.

As for the three block sync tracks for each block, two consecutive block sync tracks have the same block sync patterns, while the remaining block sync track has a different block sync pattern.

Figure 19:
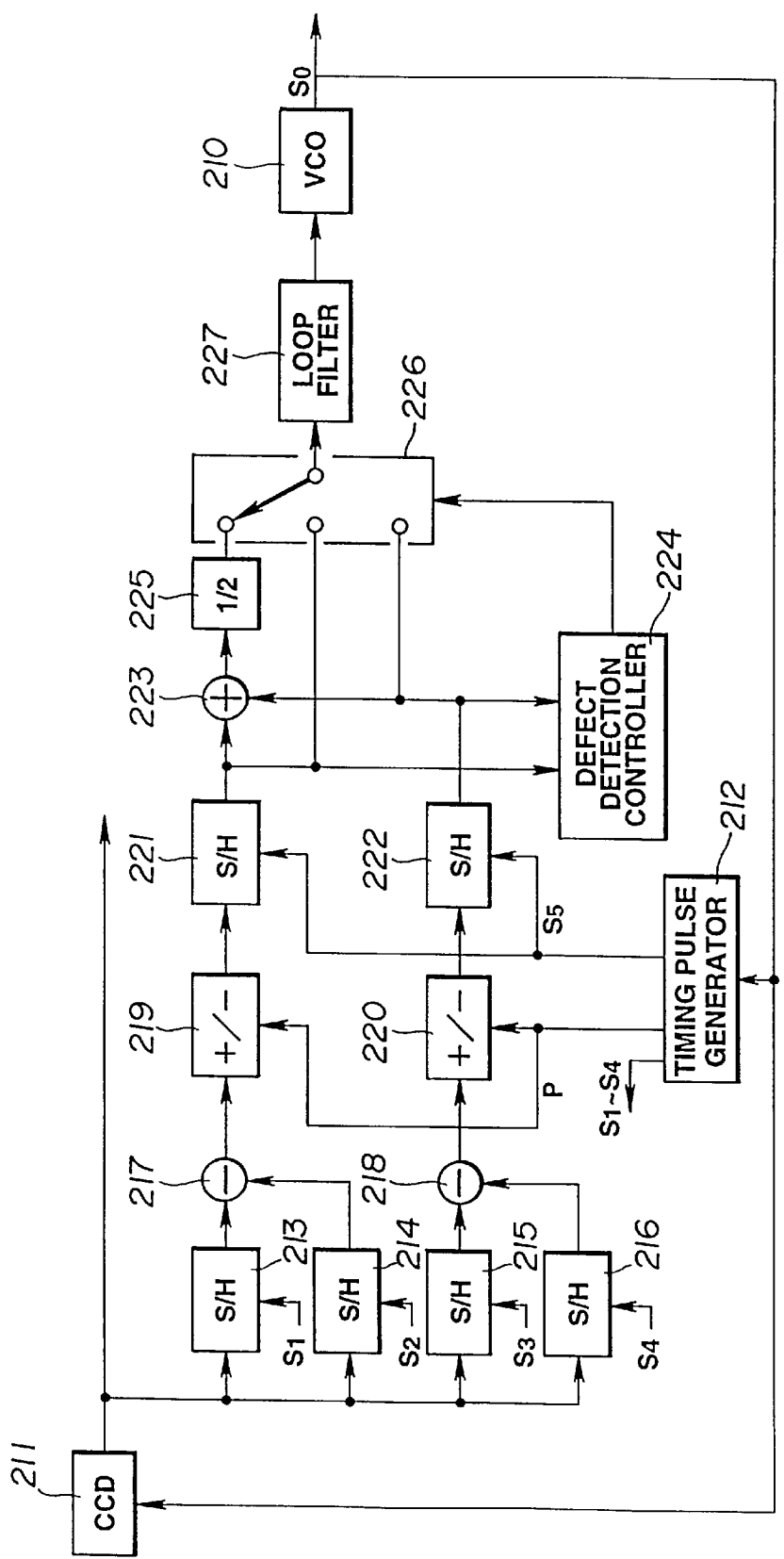
FIG. 19 is a block diagram showing the arrangement of the synchronizing control system in the reproducing device for reading and reproducing the synchronizing patterns recorded in the digital sound tracks of the motion picture film shown in FIG. 18.

Turning now to FIG. 19, the dot pattern recorded in the digital sound track 5 or 6 of the motion picture film 1 (FIG. 1) is read by the CCD line sensor 211 performing a readout operation in synchronism with the scanning start timing pulse $S_o$ supplied from the VCO 210. The scanning start timing pulse is also supplied to the synchronizing control system shown in FIG. 19, and to an audio signal reproducing system, not shown.

The synchronizing control system has first to fourth sample-and-hold circuits 213 to 216 for holding the tracking signal parts of the dot-pattern signal from the CCD line sensor 211 at different times determined by the timing pulses $S_1$ to $S_4$ supplied by the timing pulse generator 212. The timing pulse generator generates the various timing pulses in synchronism with the scan start timing pulses $S_0$. The outputs of the sample-and-hold circuits 213 and 214 are supplied to the first subtractor 217, while the outputs of the sample-and-hold circuits 215 and 216 are supplied to the second subtractor 218.

The first and second sample-and-hold circuits 213 and 214 operate in response to the timing pulses $S_1$ and $S_2$ to hold the tracking signal part of the output of the CCD line sensor 211 corresponding to the two 3-dot strings constituting the vertical synchronizing pattern in the vertical synchronizing pattern area 202A of the 12-dot tracking pattern area 202. The third and fourth sample-and-hold circuits 215 and 216 operate in response to the timing pulses S3 and S4 to hold the tracking signal part of the output of the CCD line sensor 211 corresponding to the two 5-dot strings constituting the vertical synchronizing pattern in the 10-dot tracking pattern area 203.

The difference signals from the first and second subtractors 217 and 218 are supplied to the fifth and sixth sampleand-hold circuits 221 and 222 via the polarity changeover circuits 219 and 220 operated by the timing pulses P supplied from the timing generator 212. The fifth and sixth sample-and-hold circuits 221 and 222 operate in response to the timing pulses $S_5$ supplied by the timing generator 212 to supply held outputs to the adder 223, the defect detection controller 224 and to the selector 226. The output of the adder 223 is supplied to the selector 226 via the divide-by-two circuit 225.

The selector 226 is controlled by the defect detection control circuit 224. The output of the selector 226 is fed via the low-pass filter 227 to the VCO 210. The output of the VCO 210, the scan start timing pulse $S_0$, is fed to the CCD line sensor 211 and to the timing generator 212.

With the above-described synchronization control system, the timing generator 212 generates timing pulses $S_1$ to $S_5$ and P having various timings $t_0$ to $t_5$, shown in FIGS. 20A–20H, in synchronism with the scan start timing pulse $S_0$ supplied from the VCO 210. The first and second subtractors 217 and 218 detect any deviation in vertical synchronization as a level difference between the tracking signals from the CCD line sensor 211 when reading the vertical synchronization patterns recorded with a phase shift relative to the tracks of the signal pattern area 201 (FIG. 18). The defect detection control unit 224 detects defects in the outputs of the fifth and sixth sample-and-hold circuits 221 and 222 indicating the deviations detected by the first and second subtractors 217 and 218. The defect detection control unit causes the selector 226 to select the output of the divide-by-two circuit 225 as the information indicating the deviation of vertical synchronization if it detects that neither of the held outputs of the sample-and-hold circuits 221 and 222 is defective, and causes the selector to select the held output of the sample-and-hold circuit which is not defective as the information indicating the deviation of vertical synchronization if it detects that the held output of the remaining sample-and-hold circuit is defective. The oscillation phase of the VCO 210 is controlled in response to the output by the selector 226, that is, the deviation of vertical synchronization, to effect vertically synchronizing of the scanning start timing pulse $S_0$.

If the vertical synchronization patterns were recorded with the same phase as the phase of the tracks of the signal pattern area, each track must be scanned several times to detect correct vertical synchronization. However, if the vertical synchronizing patterns are recorded with a phase shift with respect to the tracks of the signal pattern area, and the phase of the playback scanning is controlled depending on the detected vertical synchronization, correct vertical synchronization can be obtained without having to scan each track a number of times. In effect, deviations tend to be produced in the track center obtained from an intermediate value of the translucent and opaque levels due to variable recording densities, variable track widths or offsets during playback. By recording similar vertical synchronization patterns at several positions with different phases, the track center can be detected with high accuracy by reciprocal operations of the playback levels.

Moreover, by providing plural sets of vertical synchronization patterns or plural vertical synchronization patterns on opposite edges of the signal pattern area 201, and by normally achieving synchronization based on a mean value of the deviations of vertical synchronization determined from each vertical synchronization pattern, adverse effects resulting from any difference in azimuth between the CCD line sensor 21 and the tracks in the signal pattern area may be minimized. Moreover, if flaws or impurities occur in one of the vertical synchronization patterns, stable vertical synchronization may still be achieved using information from the remaining vertical synchronization pattern. Besides, by taking the difference between the two sets, it is possible to generate information indicating any azimuth difference between the CCD line sensor 211 and the tracks in the digital sound tracks.

In addition, by providing the tracking pattern area with horizontal synchronization patterns consisting of dots arrayed perpendicular to the tracks in the signal pattern area, and by detecting the peaks or edges of the signals reproduced from the horizontal synchronization patterns, a reference timing pulse for horizontal synchronization can be generated. Also, by arranging the horizontal synchronizing patterns at plural positions, stable horizontal synchronization may be achieved from the information of the remaining horizontal synchronization patterns when one of the horizontal synchronization patterns is defective. In addition, by arranging the horizontal synchronization patterns at two positions, and observing the distance from one to the other during reproduction, errors in the magnification of the optical system during recording and/or reproduction can be detected.

Furthermore, by repeatedly providing the same block synchronization patterns in plural consecutive tracks, the block synchronizing pattern can be detected despite deviations from the vertical synchronization, and reliable block-based signal processing, such as demodulation or error correction, can be performed.

What is claimed is:

1. An apparatus for reproducing digitally recorded sound signals, comprising:

motion picture film having formed thereon an optically-readable digital sound track and plural images, the motion picture film having a direction of travel, the motion picture film comprising an elongate, flexible substrate, the substrate having opposed edges and having a line of sprocket holes formed therein adjacent to each of the edges, an elongate digital pattern recording area on the substrate in the vicinity of one of the lines of sprocket holes, the digital pattern recording area having plural dots formed therein in a rectangular array of tracks substantially perpendicular to the direction of travel of the motion picture film, and columns in the direction of travel, each of the dots being in one of a first state and a second state optically distinct from one another, the digital pattern recording area being divided along the tracks into a first tracking pattern area and a second tracking pattern area, the dots in each tracking pattern area being in opposite states in consecutive tracks to form a vertical synchronizing pattern, and a signal pattern area disposed between the first tracking pattern area and the second tracking pattern area, the states of the dots in the signal pattern area representing a digital sound signal of at least one channel;

a line sensor aligned perpendicular to the direction of travel of the motion picture film, the line sensor operative to read the digital pattern recording area;

a timing circuit operative to generate a timing signal based upon the vertical synchronizing pattern read by the line sensor;

a tracking servo circuit responsive to the timing signal, the tracking servo circuit operative to generate scanning timing signals for controlling reading by the line sensor; and a sound signal reproducing circuit operative to generate sound signals based upon the states of the dots in the signal pattern area read by the line sensor.

2. The motion picture film of claim 1, wherein the dots in each track in the second tracking pattern area include a string of first dots adjacent to a string of second dots, and wherein the first dots are in the first state and the second dots are in the second state.

3. The apparatus of claim 1, wherein the tracks of the first tracking pattern area are positioned by a pre-set amount in the direction of travel of the motion picture film relative to the tracks of the second tracking pattern area.

4. The apparatus of claim 1, wherein the tracks in the tracking pattern areas are positioned in the direction of the columns relative to the tracks of the signal pattern area and are spaced therefrom in the direction of the tracks.

5. The apparatus of claim 1, wherein the dots in each track of the first tracking pattern area include a string of first dots adjacent to a string of second dots, the first dots being in a different state from the second dots.

6. The apparatus of claim 5, wherein the first dots in consecutive tracks are in opposite states.

7. The apparatus of claim 5, wherein the tracks in the first tracking pattern area are positioned in the direction of the columns relative to the tracks of the signal pattern area.

8. The apparatus of claim 1, wherein the first tracking pattern area additionally includes a column of the dots all in the same state to provide a horizontal synchronization pattern.

9. The apparatus of claim 8, wherein the first tracking pattern area additionally includes an additional column of the dots all in the same state to provide an additional horizontal synchronization pattern.

10. The apparatus of claim 8, wherein the dots of the horizontal synchronization pattern are positioned in the direction of the columns relative to the dots of the vertical synchronization pattern.

11. The apparatus of claim 1, wherein the dots in the signal pattern area represent bytes of a coded digital sound signal representative of compressed digital sound signals of plural channels.

12. The apparatus of claim 11, wherein each of the bytes of the coded digital sound signal is represented by a two-dimensional array of the dots in three consecutive ones of the tracks and in three consecutive ones of the columns, the states of the dots in each two-dimensional array being related to the respective bytes of the coded digital sound signal by 8 to 9 conversion.

13. The apparatus of claim 11, wherein the coded digital sound signal includes the digital sound signals of plural channels and appended error correction code.

14. The apparatus of claim 13, wherein the digital pattern recording area is so arranged that 80 dots make up each track and 16 tracks make up a block, one of the tracks of the block being a block sync track.

15. The apparatus of claim 13, wherein a pre-set number of tracks make up a block, each block beginning with an identical block sync pattern.

16. The apparatus of claim 13, wherein the digital pattern recording area is so arranged that 88 dots make up each track, and 48 tracks make up a block, three consecutive ones of the tracks of the block being block sync tracks.

17. An apparatus for reproducing digitally recorded sound signals, comprising:

a motion picture film having an optically-readable digital sound track formed thereon, the motion picture film having a direction of travel, the motion picture film comprising an elongate, flexible substrate, the substrate having opposed edges and having a line of sprocket holes formed therein adjacent to each of the edges, an elongate digital pattern recording area on the substrate in the vicinity of one of the lines of sprocket holes, the digital pattern recording area having plural dots formed therein in a rectangular array of tracks substantially perpendicular to the direction of travel of the motion picture film, and columns in the direction of travel, each of the dots being in one of a first state and a second state optically distinct from one another, the digital pattern recording area being divided along the tracks into a first tracking pattern area and a second tracking pattern area, the dots in each track of the first tracking pattern area include a string of first dots adjacent to a string of second dots, the first dots being in a different state from the second dots and the first dots in consecutive tracks being in opposite states to form a vertical synchronizing pattern, and a signal pattern area disposed between the first tracking pattern area and the second tracking pattern area, the states of the dots in the signal pattern area representing a digital sound signal of at least one channel;

a line sensor aligned perpendicular to the direction of travel of the motion picture film, the line sensor operative to read the digital pattern recording area;

a timing circuit operative to generate a timing signal based upon the vertical synchronizing pattern read by the line sensor;

a tracking servo circuit responsive to the timing signal, the tracking servo circuit operative to generate scanning timing signals for controlling reading by the line sensor; and a sound signal reproducing circuit operative to generate sound signals based upon the states of the dots in the signal pattern area read by the line sensor.

18. The apparatus of claim 17, wherein the first tracking pattern area additionally includes a column of the dots all in the same state to provide a horizontal synchronization pattern.

19. The apparatus of claim 18, wherein the first tracking pattern area additionally includes an additional column of the dots all in the same state to provide an additional horizontal synchronization pattern.

20. The apparatus of claim 18, wherein the dots of the horizontal synchronization pattern are positioned in the direction of the columns relative to the dots of the vertical synchronization pattern.

21. The apparatus of claim 17, wherein the tracks in the first tracking pattern area are positioned in the direction of the columns relative to the tracks of the signal pattern area.

22. The apparatus of claim 17, wherein the dots in the signal pattern area represent bytes of a coded digital sound signal representative of compressed digital sound signals of plural channels.

23. The apparatus of claim 17, wherein each of the bytes of the coded digital sound signal is represented by a two-dimensional array of the dots in three consecutive ones of the tracks and in three consecutive ones of the columns, the states of the dots in each two-dimensional array being related to the respective bytes of the coded digital sound signal by 8 to 9 conversion.

24. An apparatus for reproducing digitally recorded sound signals, comprising:

a motion picture film having an optically-readable digital sound track formed thereon, the motion picture film having a direction of travel, the motion picture film comprising an elongate, flexible substrate, the substrate having opposed edges and having a line of sprocket holes formed therein adjacent to each of the edges, an elongate digital pattern recording area on the substrate in the vicinity of one of the lines of sprocket holes, the digital pattern recording area having plural dots formed therein, each of the dots being in one of a first state and a second state optically distinct from one another, the digital pattern recording area including an elongate first tracking pattern area and an elongate second tracking pattern area, the dots in the tracking pattern areas being arranged in a rectangular array of tracks substantially perpendicular to the direction of travel of the motion picture film, and columns in the direction of travel, the dots in the first tracking pattern area being arranged to form a vertical synchronizing pattern, the vertical synchronizing pattern including a string of first dots adjacent to a string of second dots in each track of the first tracking pattern area, the first dots being in a different state from the second dots, and the first dots in consecutive tracks being in opposite states, and an elongate signal pattern area between the first tracking pattern area and the second tracking pattern area, the dots in the signal pattern area being arranged in a rectangular array of tracks substantially perpendicular to the direction of travel of the motion picture film, and columns in the direction of travel, the tracks of the signal pattern area being offset relative to the tracks of the first tracking area by a pre-set amount in the direction of travel, the states of the dots in the signal pattern area representing a digital sound signal of at least one channel;

a line sensor aligned perpendicular to the direction of travel of the motion picture film, the line sensor operative to read the digital pattern recording area;

a timing circuit operative to generate a timing signal based upon the vertical synchronizing pattern read by the line sensor;

a tracking servo circuit responsive to the timing signal, the tracking servo circuit operative to generate scanning timing signals for controlling reading by the line sensor; and a sound signal reproducing circuit operative to generate sound signals based upon the states of the dots in the signal pattern area read by the line sensor.

25. The apparatus of claim 24, wherein the first tracking pattern area additionally includes a column of the dots all in the same state to provide a horizontal synchronization pattern.

26. The apparatus of claim 25, wherein the first tracking pattern area additionally includes an additional column of the dots all in the same state to provide an additional horizontal synchronization pattern.

27. The apparatus of claim 25, wherein the dots of the horizontal synchronization pattern are positioned in the direction of the columns relative to the dots of the vertical synchronization pattern.

28. The apparatus of claim 24, wherein the dots in the signal pattern area represent bytes of a coded digital sound signal representative of compressed digital sound signals of plural channels.

29. The apparatus of claim 28, wherein each of the bytes of the coded digital sound signal is represented by a two-dimensional array of the dots in three consecutive ones of the tracks and in three consecutive ones of the columns, the states of the dots in each two-dimensional array being related to the respective bytes of the coded digital sound signal by 8 to 9 conversion.

\* \* \* \* \*